United States Patent
Zaghetto et al.

(10) Patent No.: US 11,890,545 B2
(45) Date of Patent: Feb. 6, 2024

(54) ENHANCEMENT OF GAMEPLAY EXPERIENCE BASED ON ANALYSIS OF PLAYER DATA

(71) Applicants: SONY GROUP CORPORATION, Tokyo (JP); SONY CORPORATION OF AMERICA, New York, NY (US)

(72) Inventors: Alexandre Zaghetto, San Jose, CA (US); Ali Tabatabai, Cupertino, CA (US); Danillo B Graziosi, Flagstaff, AZ (US)

(73) Assignees: SONY GROUP CORPORATION, Tokyo (JP); SONY CORPORATION OF AMERICA, New York, NY (US)

( * ) Notice: Subject to any disclaimer, the term of this patent is extended or adjusted under 35 U.S.C. 154(b) by 0 days.

(21) Appl. No.: 17/671,104

(22) Filed: Feb. 14, 2022

(65) Prior Publication Data
US 2023/0078380 A1    Mar. 16, 2023

Related U.S. Application Data

(60) Provisional application No. 63/261,150, filed on Sep. 14, 2021.

(51) Int. Cl.
*A63F 13/67* (2014.01)

(52) U.S. Cl.
CPC .................................. *A63F 13/67* (2014.09)

(58) Field of Classification Search
CPC ......... A63F 13/67; A63F 13/212; A63F 13/45
See application file for complete search history.

(56) References Cited

U.S. PATENT DOCUMENTS

| | | | |
|---|---|---|---|
| 6,335,744 B1* | 1/2002 | Korilis | G06Q 30/02 715/835 |
| 10,373,421 B2 | 8/2019 | Pan et al. | |
| 10,410,125 B1* | 9/2019 | Finkelstein | G06N 7/01 |
| 10,706,674 B2 | 7/2020 | Sorey et al. | |
| 10,799,798 B2* | 10/2020 | Aghdaie | A63F 13/822 |
| 11,575,972 B2* | 2/2023 | Rao | G06F 16/338 |
| 2002/0022516 A1* | 2/2002 | Forden | G06Q 30/02 463/32 |
| 2003/0003975 A1* | 1/2003 | Lynn | G06Q 30/02 463/1 |

(Continued)

*Primary Examiner* — Steve Rowland
(74) *Attorney, Agent, or Firm* — CHIP LAW GROUP

(57) ABSTRACT

An artificial intelligence (AI) based method for calibration of a gaming ecosystem and to maximize satisfaction of a player involved in a gaming session such as single-player gaming session, multi-player online gaming session, and a videogame recommendation system is provided. The system detects the gaming session that includes an execution of a video game for a first gameplay and acquires sensor data associated with a player involved in the first gameplay. The sensor data corresponds to a duration of the detected gaming session. The system determines one or more indicators of a dissatisfaction of the player with the first gameplay based on application of one or more Artificial Intelligence (AI) models on the sensor data. The system controls the execution of the video game to modify one or more aspects associated with the first gameplay or a second gameplay of the video game that is different from the first gameplay.

19 Claims, 12 Drawing Sheets

(56) References Cited

U.S. PATENT DOCUMENTS

| | | | |
|---|---|---|---|
| 2003/0120542 A1* | 6/2003 | Arning | G06Q 30/02 705/14.35 |
| 2004/0148221 A1* | 7/2004 | Chu | G06Q 30/0623 705/14.51 |
| 2007/0066403 A1* | 3/2007 | Conkwright | A63F 13/803 463/43 |
| 2009/0149246 A1* | 6/2009 | Opaluch | A63F 13/79 463/30 |
| 2009/0280909 A1* | 11/2009 | McEniry | A63F 13/61 463/42 |
| 2011/0258049 A1* | 10/2011 | Ramer | G06Q 30/0273 705/14.69 |
| 2014/0274355 A1* | 9/2014 | George | G06Q 30/0631 463/29 |
| 2014/0379891 A1* | 12/2014 | Arvidsson | G06Q 30/0222 709/224 |
| 2016/0067612 A1* | 3/2016 | Ntoulas | A63F 13/33 463/29 |
| 2016/0225016 A1* | 8/2016 | Patel | G06Q 30/0245 |
| 2016/0271498 A1 | 9/2016 | Lifton et al. | |
| 2017/0061528 A1* | 3/2017 | Arora | G06F 16/951 |
| 2017/0136362 A1* | 5/2017 | Bucher | A63F 13/798 |
| 2017/0206694 A1* | 7/2017 | Jiao | G06V 40/174 |
| 2017/0228976 A1* | 8/2017 | Chesworth | G07F 17/3262 |
| 2017/0357417 A1* | 12/2017 | Goossens | G06F 3/04883 |
| 2018/0078858 A1* | 3/2018 | Chai | A63F 13/216 |
| 2018/0157343 A1* | 6/2018 | Mickelsen | H04N 21/44218 |
| 2018/0189398 A1* | 7/2018 | Sternberg | G09B 5/065 |
| 2019/0355209 A1* | 11/2019 | Sorey | G07F 17/3206 |
| 2020/0206632 A1* | 7/2020 | Wang | A63F 13/213 |
| 2020/0310842 A1* | 10/2020 | Yen | G06F 9/453 |
| 2021/0027184 A1* | 1/2021 | Heuser | A63F 13/79 |
| 2021/0086089 A1* | 3/2021 | Pardeshi | G06N 3/02 |
| 2021/0241289 A1* | 8/2021 | Roy | G06N 20/00 |

* cited by examiner

ENHANCEMENT OF GAMEPLAY EXPERIENCE BASED ON ANALYSIS OF PLAYER DATA

CROSS-REFERENCE TO RELATED APPLICATIONS/INCORPORATION BY REFERENCE

This application claims priority to U.S. Provisional Patent Application Ser. No. 63/261,150 filed on Sep. 14, 2021, the entire content of which is hereby incorporated herein by reference.

FIELD

Various embodiments of the disclosure relate to video games and gameplay experience. More specifically, various embodiments of the disclosure relate to a system and method for enhancement of gameplay experience based on analysis of player data.

BACKGROUND

Video games are supposed to be designed and developed to offer a gameplay experience that must be challenging but also relaxing and entertaining, especially for children. Based on a type of game, game mechanics, and level design, the playability of a video game can vary for a certain type of player. The playability can be related to various factors, such as a skill level of the player, a difficultly posed by various aspects of the game, a complexity of game mechanics or level design, or a level of immersion offered by the game. Some video games may offer an option to manually adjust the difficulty level. However, such adjustments may not guarantee an improvement in the playability or player's satisfaction with the gameplay. In some instances, the player may be stuck for a long time (e.g., days, or even weeks) in a certain level or mission of the game, without much progress. This may generate stress or dissatisfaction for the game. Without any progress or support, the player may stop playing the game or may even show his/her displeasure or anger through various means. In some cases, the stress or anger can result in health issues, such as headaches, palpitations, insomnia, anxiety, abdominal pain, paresthesia, or other game withdrawal symptoms. This stress or anger can have an impact on mental health of the player as the player may develop a low self-esteem.

Limitations and disadvantages of conventional and traditional approaches will become apparent to one of skill in the art, through comparison of described systems with some aspects of the present disclosure, as set forth in the remainder of the present application and with reference to the drawings.

SUMMARY

A system and method for enhancement of gameplay experience based on analysis of player data is provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Figure 1:
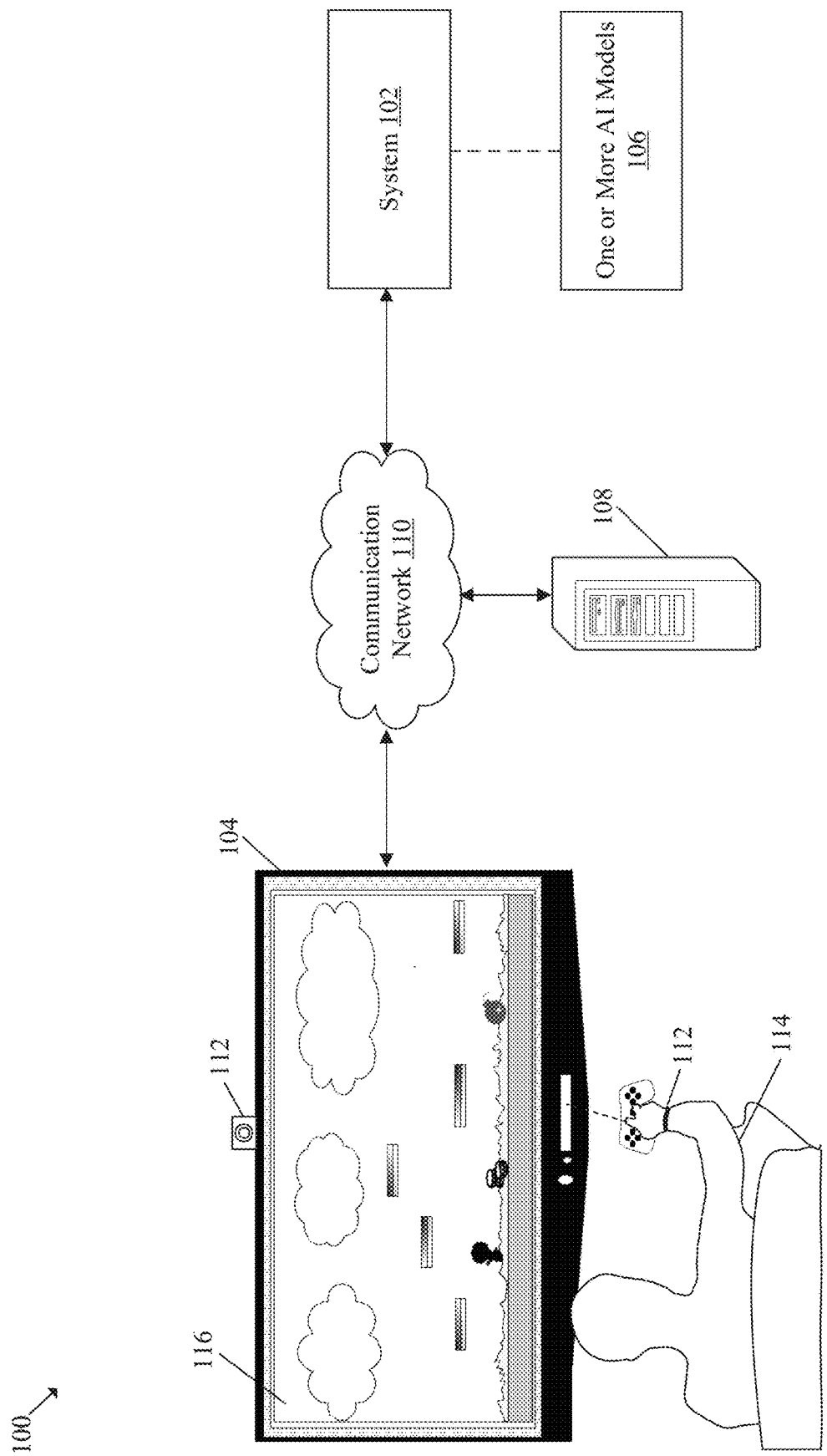
FIG. 1 is a diagram that illustrates a network environment for enhancement of gameplay experience based on analysis of player data, in accordance with an embodiment of the disclosure.

The following described implementations may be found in a disclosed system and method for enhancement of gameplay experience based on analysis of player data. The system may be configured to detect a gaming session that includes an execution of a video game for a gameplay. Based on the detection of the gaming session, the system may acquire sensor data associated with a player involved in the gameplay from one or more sensors (such as a camera, a microphone, a temperature sensor, a sweat sensor, or a haptic sensor). The sensor data may correspond to a duration of the detected gaming session. After the sensor data is acquired, the system may determine one or more indicators of a dissatisfaction of the player with the gameplay based on application of one or more Artificial Intelligence (AI) models on the sensor data. The system may control the execution of the video game based on the determined one or more indicators. The execution of the video game may be controlled to modify one or more aspects associated with the current gameplay or another gameplay of the video game that may be different from the current gameplay.

Traditionally, video games have a pre-defined set of rules and settings based on which the video game is executed. For some players, the gameplay of the video game may seem easy but for others the same gameplay can be difficult. Also, visual and audio aspects of the video games impact the playability of the video game. In some instances, the audio and visual aspects of the video games can be unpleasant to a point that players can experience stress. Due to this, some players may be dissatisfied with the gameplay and may even show game withdrawal symptoms. In some instances, the players can experience stress that may affect both physical as well as mental health of the players. Sometimes the stress can quickly escalate to anger or can invoke in changes in physiological behavior.

The disclosed system may modify certain aspects of the video game to enhance the gameplay experience of the player. The disclosed system may acquire sensor data (includes biological data) associated with the player of the video game from multiple sensors and may determine indicators of satisfaction or dissatisfaction with the gameplay based on analysis of the sensor data. The disclosed system may be configured to adjust certain aspects of the video game based on the indicators and/or a historical performance of the player in the video game. The indicators of satisfaction or dissatisfaction with the gameplay may be used to recommend new video games to the player.

The disclosed system may utilize one or more artificial intelligence (AI) models to determine a level of stress that the player may experience during the gameplay. Based on the determined level of the stress, the system may dynamically control the execution of the video game based on the determined level of stress. For example, the game difficulty may be changed from 'hard' to 'easy'. Certain visual aspects or audio aspects may be modified to reduce the level of stress. Alternatively, game rules or attributes of game objects (or game characters) may be modified to help the player complete a particular task or a level of the video game.

FIG. 1 is a diagram that illustrates a network environment for enhancement of gameplay experience based on analysis of player data, in accordance with an embodiment of the disclosure. With reference to FIG. 1, there is shown a diagram of a network environment 100. The network environment 100 includes a system 102, a display device 104, one or more AI models 106, a server 108, and a communication network 110. With reference to FIG. 1, there is further shown one or more sensors 112 and a player 114 who may be playing a video game. As shown, for example, a scene 116 of the video game is rendered on the display device 104.

The system 102 may include suitable logic, circuitry, and interfaces that may be configured to enhance the gameplay experience of the player 114 based on an analysis of sensor data acquired via the one or more sensors 112. The sensor data may correspond to a duration of a gaming session that includes an execution of the video game for a gameplay. The system 102 may be further configured to determine one or more indicators of a dissatisfaction of the player 114 using one or more AI models 106. The system 102 may control the execution of the video game based on the determined one or more indicators. In an embodiment, new video game recommendations may be provided in user's gaming account, based on such indicators. Examples of the system 102 may include, but are not limited to, a gaming console, a game controller, a handheld gaming device, a head-mounted gaming device (such as an eXtended Reality (XR) headset), a mainframe machine, a server (such as a cloud gaming server to stream video games), a computer workstation, a smartphone, a cellular phone, a mobile phone, a computing device such as a personal computer with or without a Graphics Processing Unit (GPU), and/or a consumer electronic (CE) device.

The display device 104 may include suitable logic, circuitry, and interfaces that may be configured to render visual content of scene 116 the video game. The display device 104 may be realized through several known technologies such as, but not limited to, at least one of a Liquid Crystal Display (LCD) display, a Light Emitting Diode (LED) display, a light field display, a plasma display, or an Organic LED (OLED) display technology, or other display devices. In accordance with an embodiment, the display device 104 may be a touch screen which may enable the player 114 to provide a touch-input via the display device 104. In accordance with another embodiment, the display device 104 may refer to a display screen of a head mounted device (HMD), a smart-glass device, a see-through display, a projection-based display, an electro-chromic display, or a transparent display.

Each of the one or more AI models 106 may be a classifier or regression model which may be pre-trained to predict a result based on a given input. For example, the AI model, as a classifier, may be trained to identify a relationship between inputs, such as features in a training dataset and categorical values (i.e., output labels). Each of the one or more AI models 106 may be defined by a network topology, weights, and hyper-parameters, for example, number of weights, cost function, input size, number of layers, and the like. While training, the parameters of each of the one or more AI models 106 may be tuned and weights may be updated to move towards a global minimum of a cost function for the corresponding AI model. After several epochs of the training on the features in the training dataset, each of the one or more AI models 106 may be trained to output a prediction for a set of inputs.

Each of the one or more AI models 106 may include electronic data, which may be implemented as, for example, a software component of an application executable on the system 102. Each of the one or more AI models 106 may rely on libraries, external scripts, or other logic/instructions for execution by a processing device, such as the system 102. Each of the one or more AI models 106 may include code and routines configured to enable a computing device, such as the system 102 to perform one or more operations, such as an analysis of the sensor data to determine indicators of satisfaction or dissatisfaction with a gameplay of the video game. In accordance with an embodiment, each of the one or more AI models 106 may be implemented using hardware including a processor, a microprocessor (e.g., to perform or control performance of one or more operations), a co-processor for accelerated inference, a field-programmable gate array (FPGA), or an application-specific integrated circuit (ASIC). In accordance with an embodiment, each of the one or more AI models 106 may be implemented using a combination of hardware and software.

In accordance with an embodiment, each of the one or more AI models 106 may be a Deep Neural Network (DNN) or a hybrid network that uses one or more DNNs and/or machine learning models. The DNN may be a computational network or a system of artificial neurons that may be arranged in a plurality of layers. The plurality of layers of the DNN may include an input layer, one or more hidden layers, and an output layer. Each layer of the plurality of layers may include one or more nodes (or artificial neurons, for example). Outputs of all nodes in the input layer may be coupled to at least one node of hidden layer(s). Similarly, inputs of each hidden layer may be coupled to outputs of at least one node in other layers of the deep neural network. Outputs of each hidden layer may be coupled to inputs of at least one node in other layers of the DNN. Node(s) in the final layer may receive inputs from at least one hidden layer to output a result. The number of layers and the number of nodes in each layer may be determined from hyper-parameters of the deep neural network. Such hyper-parameters may be set before or after training the DNN on a training dataset.

Each node of the deep neural network may correspond to a mathematical function (e.g., a weighted summation and an activation function such as a sigmoid function or a rectified linear unit) with a set of parameters that may be tunable during training of the network. The set of parameters may include, for example, a weight parameter, a regularization parameter, and the like. Each node may use the mathematical function to compute an output based on one or more inputs from nodes in other layer(s) (e.g., previous layer(s)) of the DNN. All or some of the nodes of the DNN may correspond to a same or a different mathematical function.

In training of the DNN, one or more parameters of each node of the DNN may be updated based on whether an output of the final layer for a given input (from the training dataset) matches a correct result based on a loss function for the DNN. The above process may be repeated for same or a different input till a minima of loss function is achieved, and a training error is minimized. Several methods for training are known in art, for example, gradient descent, stochastic gradient descent, batch gradient descent, gradient boost, meta-heuristics, and the like. In an embodiment, the DNN may be trained via supervised learning, unsupervised learning or reinforcement learning.

Examples of each of the one or more AI models 106 may include, but are not limited to, an Artificial Neural Network (ANN), Long Short-Term Memory (LSTM) network (ANN-LSTM), a Convolutional Neural Network (CNN)-LSTM network, a CNN-Recurrent Neural Network (RNN), a Connectionist Temporal Classification (CTC) model, or a Hidden Markov Model. Details of the one or more AI models 106 are provided, for example, in FIG. 2.

The server 108 may include suitable logic, circuitry, and interfaces, and/or code that may be configured to store the sensor data. The server 108 may be configured to train and store the one or more AI models 106. In an embodiment, the server 108 may be further configured to store one or more indicators of a dissatisfaction of the player 114. The server 108 may be implemented as a cloud server and may execute operations through web applications, cloud applications, HTTP requests, repository operations, file transfer, and the like. Other example implementations of the server 108 may include, but are not limited to, a database server, a file server, a web server, a media server, an application server, a mainframe server, or a cloud computing server.

In at least one embodiment, the server 108 may be implemented as a plurality of distributed cloud-based resources by use of several technologies that are well known to those ordinarily skilled in the art. A person with ordinary skill in the art will understand that the scope of the disclosure may not be limited to the implementation of the server 108 and the system 102 as two separate entities. In certain embodiments, the functionalities of the server 108 can be incorporated in its entirety or at least partially in the system 102, without a departure from the scope of the disclosure.

The communication network 110 may include a communication medium through which the system 102, the display device 104, and the server 108 may communicate with each other. The communication network 110 may include one of a wired connection or a wireless connection. Examples of the communication network 110 may include, but are not limited to, the Internet, a cloud network, Cellular or Wireless Mobile Network (such as Long-Term Evolution and 5G New Radio), a Wireless Fidelity (Wi-Fi) network, a Personal Area Network (PAN), a Local Area Network (LAN), or a Metropolitan Area Network (MAN). Various devices in the network environment 100 may be configured to connect to the communication network 110 in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity (Li-Fi), 802.16, IEEE 802.11s, IEEE 802.11g, multi-hop communication, wireless access point (AP), device to device communication, cellular communication protocols, and Bluetooth (BT) communication protocols.

In operation, the system 102 may be configured to detect a gaming session that may include an execution of the video game for a first gameplay. The first gameplay may correspond to a duration in which the player 114 may play the video game. As shown, for example, the video game may be a platform game of an action genre. However, the present disclosure may be applicable to video games of all genres or sub-genres, such as action video games, adventure video games, Real-time strategy (RTS) video games, First-Person Shooter (FPS) video games, Third-Person Shooter (TPS) video games, Multiplayer online battle arena (MOBA) video games, or Role-playing (RPG, ARPG) video games.

The system 102 may be configured to acquire the sensor data associated with the player 114 who may be involved in the first gameplay. The sensor data may be acquired from the one or more sensors 112. Examples of the one or more sensors 112 may include at least one of a camera sensor, a depth sensor, a microphone, a pressure sensor, a heart rate sensor, an accelerometer sensor, a temperature sensor, a sweat sensor, a humidity sensor, a haptic sensor, a three-dimensional (3D) scanner, a brain controlled interface, and the like.

The system 102 may be further configured to determine one or more indicators of a dissatisfaction of the player 114 with the first gameplay. The one or more indicators may be determined based on application of the one or more AI models 106 on the sensor data. In accordance with an embodiment, the one or more AI models 106 may include a signal pattern recognition model for mental state and/or activity recognition, a natural language processing model for text classification, and/or an emotion detection model from signals or face images. Details about the one or more AI models 106 are provided, for example, in FIG. 2.

In accordance with an embodiment, the one or more indicators of the dissatisfaction may include at least one of a facial expression, a body language, a verbal tone, a physiological reaction, an emotion, one or more behavioral changes or actions of the player in the duration of the detected gaming session, a stress level (associated with one or more gameplays), or one or more keywords enunciated by the player 114 within the duration of the detected gaming session.

The system 102 may be further configured to control the execution of the video game based on the determined one or more indicators. The execution may be controlled to modify one or more aspects associated with the first gameplay or a second gameplay of the video game. The second gameplay may be different from the first gameplay. Herein, the terms such as "first gameplay" and "second gameplay" may correspond to two discrete gameplay events, in which the player 114 played the video game. Both the first gameplay and the second gameplay may or may not correspond to common game state(s) or game level(s) of the video game.

In accordance with an embodiment, the modification in the one or more aspects may include at least one of a change in one or more game states of the video game that may be associated with the first gameplay or the second gameplay, a change in one or more attributes of a visual component included in the video game, a change in one or more attributes of an audible component included in the video game, an activation of a hint or a guide for a level or a segment associated with the first gameplay or the second gameplay, a switch from a current game difficulty level to a different game difficulty level, an activation of an option to skip a level or an objective of the level associated with the first gameplay or the second gameplay, or an activation of an alternate option to complete the level or the objective. In an embodiment, the activation of the alternate option to complete the level or the objective may not only correspond to changing a virtual "geographic" route inside the video game, like two different paths, but also changing one or more events related to a story of the video game. Details about the modification of the one or more aspects are provided, for example, in FIGS. 5A, 5B, 5C, 6A, 6B, 7A, and 7B. In an embodiment, the video game may be a co-operative game. In such an embodiment, the modification in the one or more aspects may include a modification in an ability of a game character or object that is controlled by the player 114.

Figure 2:
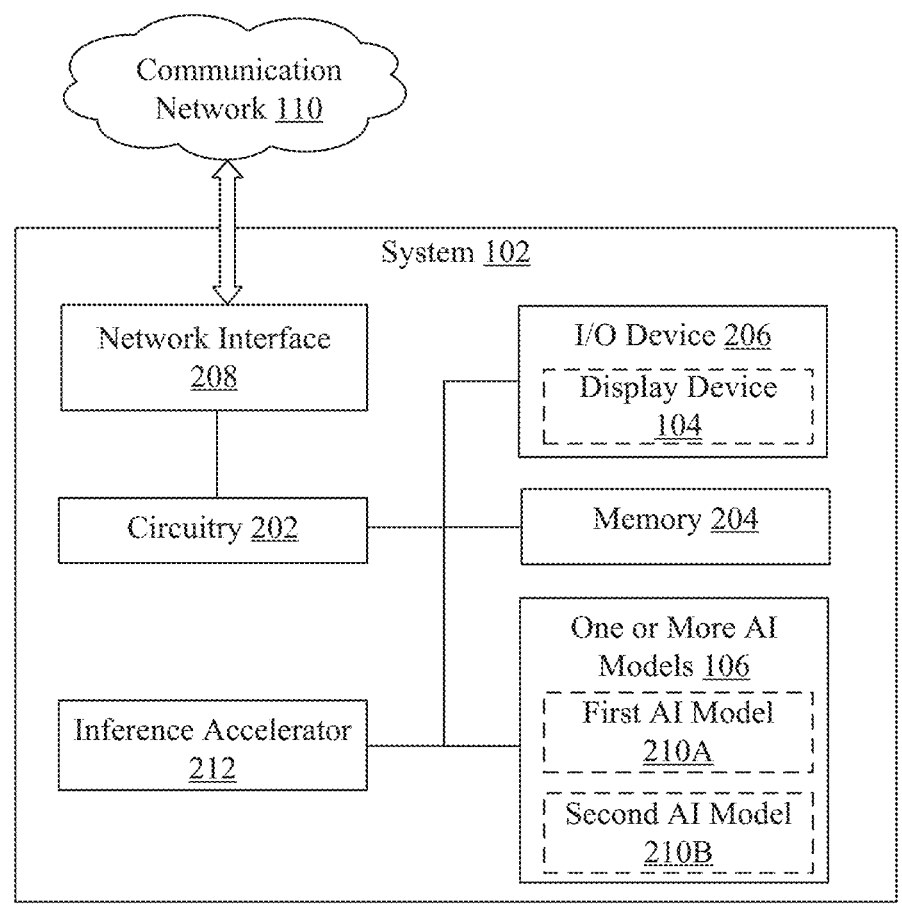
FIG. 2 is an exemplary block diagram of a system for enhancement of gameplay experience based on analysis of player data, in accordance with an embodiment of the disclosure.

FIG. 2 is an exemplary block diagram of a system for enhancement of gameplay experience based on analysis of player data, in accordance with an embodiment of the disclosure. FIG. 2 is explained in conjunction with elements from FIG. 1. With reference to FIG. 2, there is shown a block diagram 200 of the system 102 of FIG. 1. The system includes circuitry 202, a memory 204, an input/output (I/O) device 206, a network interface 208, a first AI model 210A of the one or more AI models 106, a second AI model 210B of the one or more AI models 106, and an inference accelerator 212. In accordance with an embodiment, the system 102 may not include the inference accelerator 212. In such a case, the system 102 may implement and/or improve low-precision arithmetic operations, quantization of neural weights, and techniques such as pruning to reduce the size and the computational resource requirement of the one or more AI models 106.

The circuitry 202 may include suitable logic, circuitry, and interfaces that may be configured to execute program instructions associated with different operations to be executed by the system 102. For example, some of the operations may include detection of the gaming session, acquisition of the sensor data, determination of the one or more indicators of a dissatisfaction with the gameplay, and control of the execution of the video game. The circuitry 202 may include one or more processing units, which may be implemented as a separate processor. In an embodiment, the one or more processing units may be implemented as an integrated processor or a cluster of processors that perform the functions of the one or more processing units, collectively. The circuitry 202 may be implemented based on several processor technologies known in the art. Example implementations of the circuitry 202 may include, but are not limited to, an x86-based processor, a Graphics Processing Unit (GPU), a Reduced Instruction Set Computing (RISC) processor, an Application-Specific Integrated Circuit (ASIC) processor, Tensor Processing Unit (TPU), a Complex Instruction Set Computing (CISC) processor, a microcontroller, a central processing unit (CPU), and/or a combination thereof.

The memory 204 may include suitable logic, circuitry, and/or interfaces that may be configured to store the program instructions executable by the circuitry 202. Additionally, the memory 204 may store the acquired sensor data and the determined one or more indicators. In at least one embodiment, the memory 204 may also store a satisfaction level of the player 114, a profile of the player 114, a time threshold, a count threshold, an audio spoken by the player 114, a video of the gameplay of the player 114, and an image of the player 114. In another embodiment, the memory 204 may be further configured to store the one or more AI models 106. Examples of implementation of the memory 204 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The I/O device 206 may include suitable logic, circuitry, and/or interfaces that may be configured to receive one or more user inputs and/or render the video game. The I/O device 206 may include various input and output devices, which may be configured to communicate with different operational components of the system 102. Examples of the I/O device 206 may include, but are not limited to, a touch screen, a keyboard, a mouse, a joystick, a microphone, a camera (for input commands based on hand gesture) and a display device (such as the display device 104).

The network interface 208 may include suitable logic, circuitry, interfaces, and/or code that may be configured to establish communication between the system 102, the display device 104, the one or more AI models 106, the server 108, and the one or more sensors 112, via the communication network 110. The network interface 208 may be configured to implement known technologies to support wired or wireless communication. The network interface 208 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, and/or a local buffer.

The network interface 208 may be configured to communicate via offline and online wireless communication with networks, such as the Internet, an Intranet, and/or a wireless network, such as a cellular telephone network, a wireless local area network (WLAN), personal area network, and/or a metropolitan area network (MAN). The wireless communication may use any of a plurality of communication standards, protocols and technologies, such as Global System for Mobile Communications (GSM), Enhanced Data GSM Environment (EDGE), wideband code division multiple access (W-CDMA), code division multiple access (CDMA), LTE, time division multiple access (TDMA), Bluetooth, Wireless Fidelity (Wi-Fi) (such as IEEE 802.11, IEEE 802.11b, IEEE 802.11g, IEEE 802.11n, and/or any other IEEE 802.11 protocol), voice over Internet Protocol (VoIP), Wi-MAX, Internet-of-Things (loT) technology, Machine-Type-Communication (MTC) technology, a protocol for email, instant messaging, and/or Short Message Service (SMS).

The first AI model 210A may be a natural language processing model that may be trained on a task of keyword detection. In an embodiment, the system 102 may perform a set of operations on the audio spoken by the player 114 before the first AI model 210A may be applied to detect keywords or key phrases from the spoken audio. Such operations may include, for example, a normalization and pre-emphasis operation, a framing operation, a transformation operation, and the like. In the normalization and pre-emphasis operation, the spoken audio may be passed through a filter (such as a high pass filter or a low pass filter) to reduce noise. In the framing operation, the spoken audio may be further divided into one or more frames. In the transformation operation, the spoken audio may be further decomposed into a set of harmonics of different frequencies and amplitudes. The keywords may be detected based on the set of harmonics. In an embodiment, the detected keywords may be associated with one or more causes for a failure in the video game.

The first AI model 210A may include electronic data, which may be implemented as, for example, a software component of an application executable on the system 102. The first AI model 210A may rely on libraries, external scripts, or other logic/instructions for execution by a processing device, such as circuitry. The first AI model 210A may include code and routines configured to enable a computing device, such as the system 102 to perform one or more operations, such as an analysis of the spoken audio. The analysis of the spoken audio may include a conversion of the portion of the audio content to a text and a determination of one or more keywords or key phrases associated with one or more items of interest from the text. In accordance with an embodiment, the first AI model 210A may be implemented using hardware including a processor, a microprocessor (e.g., to perform or control performance of one or more operations), a field-programmable gate array (FPGA), or an application-specific integrated circuit (ASIC). Alternatively, in some embodiments, the first AI model 210A may be implemented using a combination of hardware and software.

In accordance with an embodiment, the first AI model 210A may be a Deep Neural Networks or a hybrid network that uses one or more DNNs. The deep neural network may be a computational network or a system of artificial neurons, arranged in a plurality of layers, as nodes. The plurality of layers of the deep neural network may include an input layer, one or more hidden layers, and an output layer. Each layer of the plurality of layers may include one or more nodes (or artificial neuron). Outputs of all nodes in the input layer may be coupled to at least one node of hidden layer(s). Similarly, inputs of each hidden layer may be coupled to outputs of at least one node in other layers of the deep neural network. Outputs of each hidden layer may be coupled to inputs of at least one node in other layers of the deep neural network. Node(s) in the final layer may receive inputs from at least one hidden layer to output a result. The number of layers and the number of nodes in each layer may be determined from hyper-parameters of the deep neural network. Such hyper-parameters may be set before or after training the deep neural network on a training dataset.

Each node of the deep neural network may correspond to a mathematical function (e.g., a sigmoid function or a rectified linear unit) with a set of parameters, tunable during training of the network. The set of parameters may include, for example, a weight parameter, a regularization parameter, and the like. Each node may use the mathematical function to compute an output based on one or more inputs from nodes in other layer(s) (e.g., previous layer(s)) of the deep neural network. All or some of the nodes of the deep neural network may correspond to same or a different mathematical function.

In training of the deep neural network, one or more parameters of each node of the deep neural network may be updated based on whether an output of the final layer for a given input (from the training dataset) matches a correct result based on a loss function for the deep neural network. The above process may be repeated for same or a different input till a minima of loss function may be achieved, and a training error may be minimized. Several methods for training are known in art, for example, gradient descent, stochastic gradient descent, batch gradient descent, gradient boost, meta-heuristics, and the like.

Examples of the first AI model 210A may include, but are not limited to, an Artificial Neural Network (ANN)-Long Short-Term Memory (LSTM) network (ANN-LSTM), a Convolutional Neural Network (CNN)-LSTM network, a CNN-Recurrent Neural Network (RNN), a Connectionist Temporal Classification (CTC) model, or a Hidden Markov Model.

The second AI model 210B may be an emotion detection model that may be trained on a task of determination of an emotional state of the player 114. In an embodiment, the system 102 may perform a set of operations on an image of the player 114 to determine the emotional state of the player 114. Such operations may include, for example, a face detection operation, a facial landmarks detection operation, a data standardization operation, and the like.

The second AI model 210B may include electronic data, which may be implemented as, for example, a software component of an application executable on the system 102. The second AI model 210B may rely on libraries, external scripts, or other logic/instructions for execution by a processing device, such as circuitry. The second AI model 210B may include code and routines configured to enable a computing device, such as the system 102 to perform one or more operations, such as the emotional state determination. In accordance with an embodiment, the second AI model 210B may be implemented using hardware including a processor, a microprocessor (e.g., to perform or control performance of one or more operations), a field-programmable gate array (FPGA), or an application-specific integrated circuit (ASIC). Alternatively, in some embodiments, the second AI model 210B may be implemented using a combination of hardware and software.

In accordance with an embodiment, the second AI model 210B may be a Deep Neural Networks or a hybrid network that uses one or more DNNs. The deep neural network may be a computational network or a system of artificial neurons, arranged in a plurality of layers, as nodes. The plurality of layers of the deep neural network may include an input layer, one or more hidden layers, and an output layer. Each layer of the plurality of layers may include one or more nodes (or artificial neurons). Outputs of all nodes in the input layer may be coupled to at least one node of hidden layer(s). Similarly, inputs of each hidden layer may be coupled to outputs of at least one node in other layers of the deep neural network. Outputs of each hidden layer may be coupled to inputs of at least one node in other layers of the deep neural network. Node(s) in the final layer may receive inputs from at least one hidden layer to output a result. The number of layers and the number of nodes in each layer may be determined from hyper-parameters of the deep neural network. Such hyper-parameters may be set before or after training the deep neural network on a training dataset.

Each node of the deep neural network may correspond to a mathematical function (e.g., a sigmoid function or a rectified linear unit) with a set of parameters, tunable during training of the network. The set of parameters may include, for example, a weight parameter, a regularization parameter, and the like. Each node may use the mathematical function to compute an output based on one or more inputs from nodes in other layer(s) (e.g., previous layer(s)) of the deep neural network. All or some of the nodes of the deep neural network may correspond to same or a different mathematical function.

In training of the deep neural network, one or more parameters of each node of the deep neural network may be updated based on whether an output of the final layer for a given input (from the training dataset) matches a correct result based on a loss function for the deep neural network. The above process may be repeated for same or a different input till a minima of loss function may be achieved, and a training error may be minimized. Several methods for training are known in art, for example, gradient descent, stochastic gradient descent, batch gradient descent, gradient boost, meta-heuristics, and the like.

Examples of the second AI model 210B may include, but are not limited to, an Artificial Neural Network (ANN), CNN+ANN, R-CNN, Fast R-CNN, Faster R-CNN, (You Only Look Once) YOLO network, a fully connected neural network, a deep Bayesian neural network, and a Generative Adversarial Network (GAN).

The inference accelerator 212 may include suitable logic, circuitry, interfaces, and/or code that may be configured to operate as a co-processor for the processor to accelerate computations associated with the operations of the one or more AI models 106. For instance, the inference accelerator 212 may accelerate the computations on the system 102 such that an output of each of the one or more AI models 106 is generated in less time than what is typically incurred without the use of the inference accelerator 212. The inference accelerator 212 may implement various acceleration techniques, such as parallelization of some or all the operations of the one or more AI models 106. The inference accelerator 212 may be implemented as a software, a hardware, or a combination thereof. Example implementations of the inference accelerator 212 may include, but are not limited to, a GPU, a Tensor Processing Unit (TPU), a neuromorphic chip, a Vision Processing Unit (VPU), a field-programmable gate arrays (FGPA), a Reduced Instruction Set Computing (RISC) processor, an Application-Specific Integrated Circuit (ASIC) processor, a Complex Instruction Set Computing (CISC) processor, a microcontroller, and/or a combination thereof.

Figure 3:
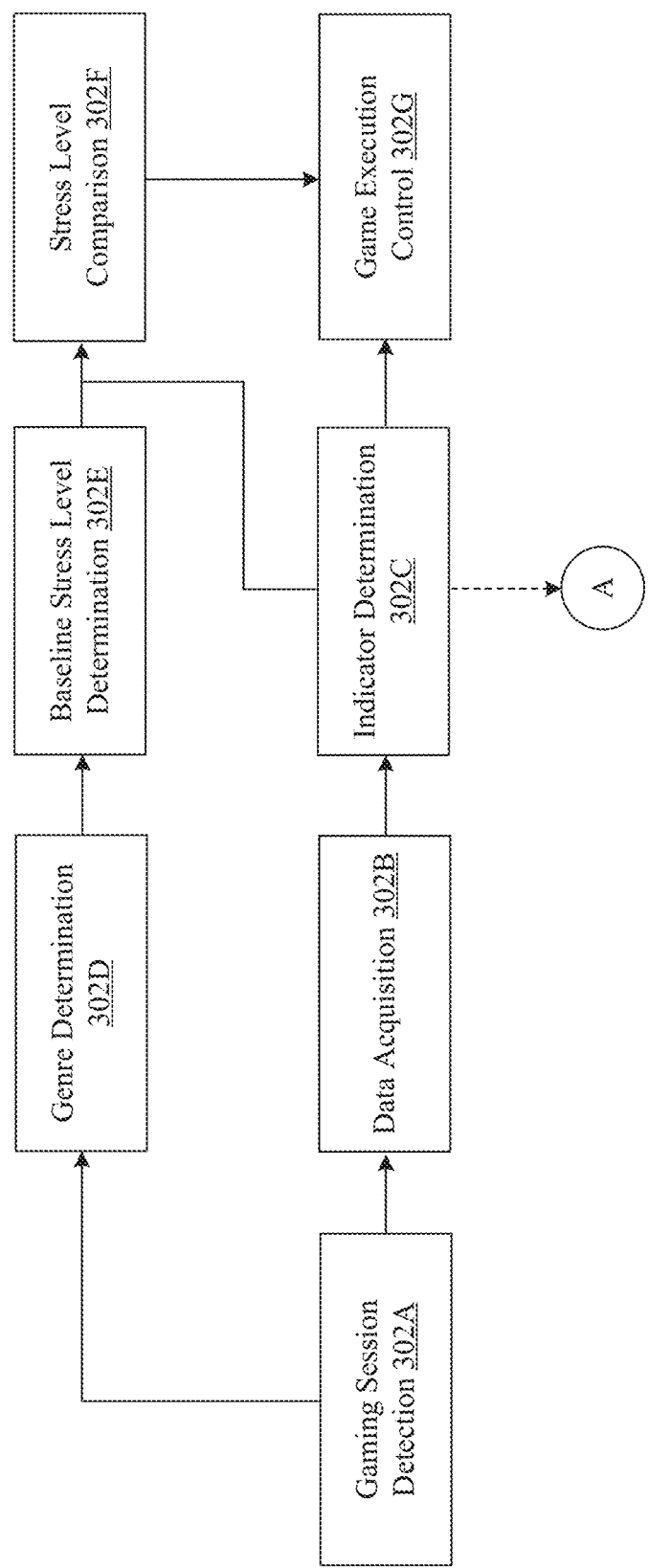
FIG. 3 is a diagram that illustrates exemplary operations for enhancement of gameplay experience based on analysis of player data, in accordance with an embodiment of the disclosure.

FIG. 3 is a diagram that illustrates exemplary operations for enhancement of gameplay experience based on analysis of player data, in accordance with an embodiment of the disclosure. FIG. 3 is explained in conjunction with elements from FIG. 1 and FIG. 2. With reference to FIG. 3, there is shown a block diagram 300 that illustrates exemplary operations from 302A to 302G, as described herein. The exemplary operations illustrated in the block diagram 300 may start at 302A and may be performed by any computing system, apparatus, or device, such as by the system 102 of FIG. 1 or circuitry 202 of FIG. 2. Although illustrated with discrete blocks, the exemplary operations associated with one or more blocks of the block diagram 300 may be divided into additional blocks, combined into fewer blocks, or eliminated, depending on the implementation.

At 302A, a gaming session may be detected. In accordance with an embodiment, the circuitry 202 may be configured to detect a gaming session. The gaming session may include an execution of the video game for a first gameplay. The first gameplay may be associated with the player 114. The first gameplay may correspond to a duration of the gaming session and may be defined by a specific manner in the player 114 plays the video game. The first gameplay may uniquely identify the behavior and actions of the player 114 in relation to one or more game rules (i.e., a part of game mechanics), one or more game characters in the video game, a plot or storyline, one or more objectives in the video game, and different elements with which the player 114 can interact with in the video game.

Herein, the video game may be an electronic game that may involve interaction of the player 114 with one or more visual elements (e.g., a game character and other game objects) of the video game. Such elements may appear in a synthetic or virtual game scene 116 rendered on a user interface of the display device 104. The player 114 may interact with the one or more visual elements via an input device (such as a hand-held game controller or a wearable input device). In an embodiment, the input device may render visual feedback, audible feedback, and/or a haptic feedback based on inputs provided by the player 114. The video game may be classified based on a genre or a sub-genre. Examples of different genres of the video game may include, but are not limited to, an action genre, an action-adventure genre, an adventure genre, a role-playing genre, a simulation genre, a strategy genre, a sports genre, a puzzle genre, a platformer genre, and a horror genre. The video game may be available in platform-specific versions which may run on multiple platforms, such as a computer, a game console, a handheld game device, an arcade setup, an XR device, a television, a web browser, a cloud gaming system, or an emulator. Different sub-genres of the video game may include, but are not limited to, a platform game, a shooter game, a fighting game, a stealth game, a survival game, a rhythm game, a battle-royale game, a survival horror game, a Metroid Vania video game, a text adventure video game, a graphic adventure video game, a visual novel video game, an Interactive movie video game, a Real-time 3D adventure video game, an action role-playing video game (RPG), a massively multiplayer online role-playing video game, a roguelike video game, a tactical role-playing video game, a first-person party-based RPG video game, a sandbox RPG video game, a Japanese role-playing video game, a Life simulation video games, a vehicle simulation video game, a 4X video game, an Artillery video game, an Auto battler video game, a multiplayer online battle arena (MOBA) video game, a real-time strategy (RTS) video game, a real-time tactics (RTT) video game, a tower defense video game, a wargame based video game, a sports video game, a racing video game, a board video game or card video game, a breakout clone video game, a casino video game, a digital collectible card video game, a horror video game, an idle video game, a logic video game, a party video game, a photography video game, a programming video game, a social deduction video game, a trivia video game, a typing video game, an advergame, an art video game, a casual video game, a Christian video game, an educational video game, an esports video game, an exergame, a personalized video game, a serious video game, and the like.

At 302B, a data acquisition operation may be performed. In the data acquisition operation, the circuitry 202 may be configured to acquire sensor data associated with the player 114 who may be involved in the first gameplay. In an embodiment, the circuitry 202 may be configured to control the one or more sensors 112 to capture the sensor data associated with the player 114 from the one or more sensors 112. Specifically, the sensor data may be captured while the player 114 may be playing the video game. The sensor data may correspond to a duration of the detected gaming session.

In accordance with an embodiment, the one or more sensors 112 may include, but are not limited to, a camera sensor, a depth sensor, a microphone, a pressure sensor, a heart rate sensor, an accelerometer sensor, a temperature sensor, a sweat sensor, a haptic sensor, a three-dimensional (3D) scanner, or a brain controlled interface. The camera sensor may be configured to capture one or more images of the player 114 within the duration of the detected gaming session. The depth sensor may be configured to capture depth information associated with the player 114 within the duration of the detected gaming session. The microphone may be configured to capture an audio associated with the player 114 within the duration of the detected gaming session. The heart rate sensor may be configured to capture the heart rate of the player 114 within the duration of the detected gaming session. The accelerometer sensor may be configured to capture acceleration of one or more body parts of the player 114 within the duration of the detected gaming session. The temperature sensor may be configured to capture temperature of the player 114 within the duration of the detected gaming session. The sweat sensor may be configured to capture an amount of sweat produced by the player 114 within the duration of the detected gaming session. The haptic sensor may be configured to capture a haptic input that may be provided by the player 114 within the duration of the detected gaming session. The three-dimensional (3D) scanner may be configured to capture a 3D scan of an environment in which the player 114 within the duration of the detected gaming session. The pressure sensor may be configured to capture pressure exerted by the player 114 on one or more buttons of a video game controller. The brain controlled interface may be configured to capture brain signals (or electroencephalogram (EEG) signals) from the head of the player 114 and within the duration of the detected gaming session. In accordance with an embodiment, the data captured by the heart rate sensor, the temperature sensor, the sweat sensor, and the brain controlled interface may be referred to as bio signals associated with the player 114.

The player 114 may wear at least one sensor of the one or more sensors 112 for at least the duration of the detected gaming session. For example, the heart rate sensor, the sweat sensor, and the brain controlled interface may be worn by the player 114 during the first gameplay. At least one sensor may be placed near the player 114. For example, the camera sensor, the depth sensor, the microphone, the humidity sensor, and the three-dimensional (3D) scanner may be placed near the player 114. At least one sensor of the one or more sensors 112 may be installed within the system 102 such as the pressure sensor (or the temperature sensor or the haptic sensor) may be installed within the video game controller or the camera sensor may be installed within a video gaming console.

At 302C, an indicator determination operation may be performed. In the indicator determination operation, the circuitry 202 may be configured to determine one or more indicators of a dissatisfaction of the player 114 with the first gameplay. For instance, the player 114 may be dissatisfied with the first gameplay due to a variety of reasons. Some of the reasons may include that the player 114 may have been stuck at a particular level of the video game for a period (e.g., 1 hour) or the player 114 may have failed to defeat a particular enemy after many attempts, and the like. In another embodiment, some of the reasons for the dissatisfaction of the player 114 may be associated with the audio and visual aspects of the video game. For example, the sound in some part of the video game may be unpleasant or the pictures of the video game may have a high contrast. This dissatisfaction may cause the player 114 to stop playing the video game and/or show game withdrawal symptoms, such as anger, anxiety, palpitation, and/or frustration.

In accordance with an embodiment, the one or more indicators of the dissatisfaction may include at least one of a facial expression, a body language, a verbal tone, a physiological reaction, an emotion, one or more behavioral changes, or certain actions of the player 114 in the duration of the detected session, a stress level, or one or more keywords enunciated by the player 114 within the duration of the detected gaming session. As an example, the actions of the player 114 may include an act of hard pressing one or more keys of the video game controller, pressing the keys of the controller randomly during the load between two gameplays or in too much contradiction to what the game expects from the payer at a specific moment, throwing objects, shouting, or speaking abusive words, and the like.

The circuitry 202 may determine the one or more indicators of the dissatisfaction of the player 114 with the first gameplay, based on the application of the one or more AI models 106 on the acquired sensor data. In accordance with an embodiment, the circuitry 202 may select at least one AI model of the one or more AI models 106 that may be applied on the acquired sensor data. The selection of the at least one AI model may be based on the sensor data or the sensor from which the sensor data may be acquired. For example, if the sensor data corresponds to audio of the player 114 (acquired from the microphone), then the first AI model 210A may be applied on the sensor data to determine the one or more indicators associated with a verbal tone or a mood/emotion of the player 114. As another example, if the sensor data corresponds to an image of the player 114, then the second AI model 210B may be applied on the sensor data to determine the one or more indicators associated with a facial expression of the player 114, a body language of the player 114, or a physiological reaction of the player 114.

In accordance with an embodiment, each of the one or more AI models 106 may be applied on a respective portion of the sensor data (captured by the one or more sensors 112). For example, the first AI model 210A may be applied if the sensor is microphone, the second AI model 210B may be applied if the sensor is camera sensor, and the like. In an embodiment, the one or more AI models 106 may correspond to a hybrid model that may be applicable on all types of sensor data. Details about the sensor data and the one or more AI models 106 are provided in detail, for example, in FIGS. 6A, 6B, 7A, and 7B.

At 302D, a genre determination operation may be performed. In the genre determination operation, the circuitry 202 may be configured to determine a genre of the video game. In an embodiment, the determined genre of the video game may be stored on the server 108 or a web-based data source, such as a website or a gaming account of the player 114. The circuitry 202 may be configured to retrieve the genre of the video game from the server 108 or the web-based data source.

At 302E, a baseline stress level determination operation may be performed. In the baseline stress level determination, the circuitry 202 may be configured to determine a baseline stress level of the player 114 for each genre of a plurality of video game genres. For each genre of the plurality of video games genres, the baseline stress level may be a minimum threshold stress level, above which the player 114 may be determined to be stressed for a respective video game genre. The baseline stress level for each genre may be determined based on historical data collected by the system 102 over a period (e.g., last 1-3 months). In accordance with an embodiment, the baseline stress level for each genre may be stored in a profile of the player 114. The baseline stress level for each genre may be personalized for the player 114 and may be updated at regular intervals throughout the lifetime of the player 114 or a specific duration. In such a case, the circuitry 202 may be configured to determine the baseline stress level for the genre of the video game from the profile of the player 114. Details about the generation of the profile of the player 114 are provided, for example, in FIG. 4.

At 302F, a stress level comparison operation may be performed. In the stress level comparison operation, the circuitry 202 may be configured to compare the determined the baseline stress level associated with the genre of the video game with a stress level included in the determined one or more indicators. In case the determined baseline stress level associated with the genre of the video game is greater than or equal to the stress level included in the determined one or more indicators, then a value of a comparison result variable may be set to zero (0). Otherwise, the value of the comparison result variable may be set to one (1).

In an embodiment, in addition to the baseline stress level, the circuitry 202 may be configured to determine the one or more indicators based on an emotional state of the player 114, a facial expression of the player 114, an audio spoken by the player 114, behavioral changes or actions of the player 114 and the like. Details about the one or more indicators based on the emotional state of the player 114, the facial expression of the player 114, and the audio spoken by the player 114 are provided, for example, in FIGS. 6A, 6B, 7A, and 7B.

At 302G, a game execution may be controlled. In accordance with an embodiment, the circuitry 202 may be configured to control the execution of the video game based on the determined one or more indicators. The execution of the video game may be controlled if the value of the comparison result variable is one (1).

The execution may be controlled to modify one or more aspects associated with the first gameplay or a second gameplay of the video game that may be different from the first gameplay. In an embodiment, the modification may include at least one of a change in one or more game states of the video game that may be associated with the first gameplay or the second gameplay, a change in one or more attributes of a visual component included in the video game, a change in one or more attributes of an audible component included in the video game, an activation of a hint or a guide for a level or a segment of the first gameplay or the second gameplay, a switch from a current game difficulty level to a different game difficulty level, an activation of an option to skip a level or an objective of the level associated with the first gameplay or the second gameplay, an activation of an alternate option to complete the level or the objective, or an activation of a different storyline. As an example, if the video game is a shooter video game, then the volume of footsteps of one or more enemy game characters may be increased, so that the player 114 can easily detect or approximate a location where the one or more enemy game characters may be present. As another example, the circuitry 202 may detect that the game character controlled by the player 114 is dying at a particular spot in the video game in all the attempts. In such a case, the circuitry 202 provide a hint to the player 114 to follow an alternate path or to skip the spot or an objective that is associated with the spot.

In accordance with an embodiment, the modification may include a change in an ability of a game character or object that may be controlled by the player 114 or a change in the ability or a behavior of an enemy/opponent game character or game object. The enemy/opponent game character or the game object may be controlled by another human player or by an AI agent. The AI agent may be a computer program that may control the enemy/opponent game character or the game object, without a human input. For example, if the video game is street fight game, then strength and endurance of the game character controlled by the player 114 may increase whereas the strength and the endurance of the enemy game character may be decrease at the start of the gameplay.

In accordance with an embodiment, the change in the one or more attributes of the visual component included in the video game may correspond to a change in a color temperature, a brightness, a contrast, or other display parameters of the visual component included in the video game. For example, if the visual component is a bright light or graphic images (e.g., blood or dead body) that suddenly appears in the scene, then then the color temperature, the color, the brightness, and the contrast of the visual component(s) may be adjusted to reduce the stress of the player 114 below the baseline stress level. Similarly, the change in one or more attributes of the audible component included in the video game may correspond to a change in a volume, a bass, a treble, and other parameters. For example, If the audible component corresponds to an unpleasant background music, a spooky voice, or a shrilling sound in in a specific game level, then the volume or pitch of the sound may be adjusted to reduce the stress levels of the player 114 below the baseline stress levels. Different music composers may compose the soundtrack of the video game for each part of the game. For instance, one may have different tracks associated with a boss fight and a specific track may be triggered for the same boss depending on the stress level of the player. The music track could have the effect of reducing stress or encourage the player to try harder, depending on the situation.

In accordance with an embodiment, the activation of a hint or a guide for a level or a segment of the first gameplay or the second gameplay may correspond to rendering of a visual or an audible hint to assist the player 114 to complete the level or the segment. For example, a marker may be displayed to help the player 114 navigate or explore items of interest in the game level. The switch from the current game difficulty level to a different game difficulty level may correspond to modification of the game difficulty settings. For example, the current difficulty level of the video game may be set to "Hard". While playing the video game in the "Hard" difficulty level, it may be determined that the player 114 is dissatisfied or is under stress (above the baseline stress levels). In such a case, the circuitry 202 may automatically change the current difficulty level of the video game from "Hard" to "Easy" or "moderate". Once the system 102 detects that the stress level has been controlled, the circuitry 202 may be configured to automatically change the difficulty level back to "Hard", thus providing a dynamic adaptation.

In accordance with an embodiment, the activation of the option to skip the level associated with the first gameplay or the second gameplay may correspond to rendering of a button interface on the user interface to skip the level or an objective (in a linear gameplay or a non-linear gameplay) and proceed to a next level or another objective. For example, if the player 114 is unable to win a boss fight in an action-adventure game after several attempts, then the skip option may be provided to the player 114 to skip the boss fight and proceed to the next item or objective in the video game's story or pipeline of levels or objectives. The activation of the objective of the level associated with the first gameplay or the second gameplay may correspond to rendering of a visual or an audible notification that may describe the objective of the level so that the player 114 may complete the level and proceed to the next level. The activation of an alternate option to complete the level or the objective may correspond to rendering on an alternative option to complete one or more tasks which, when performed, may be considered to mark the level or the objective as complete. For example, if the player 114 is unable to defeat five types of enemies in a battle arena, then an alternate option to defeat three types of enemies may be provided to the player 114. If the player 114 can defeat the three types of enemies in the battle arena, then the fight (or the objective) associated with the battle arena may be marked as a win (or complete). In an embodiment, these activations may occur preemptively. For instance, if the player has to complete a sequence of phases or tasks to complete finish the playthrough, then, based on the current performance, the system 102 may anticipatedly adjust the game or skip future phases or task. In this case, activation does not occur between two gameplays but in one single playthrough. Details on control of the execution of the video game are further provided in detail, for example, in FIGS. 5A, 5B, 5C, 6A, 6B, 7A, and 7B.

In an embodiment, the circuitry 202 may be configured to narrate a secondary story line or other resources (such as secondary paths) so that player 114 can stay engaged in the video game. This may be done to enhance the satisfaction of the player 114.

In an embodiment, the video game may be a multi-player video game. In such a case, the circuitry 202 may be configured to detect a gaming session that may include an execution of the multi-player video game for a first gameplay. The circuitry 202 may be further configured to acquire sensor data associated with a plurality of players involved in the first gameplay and may determine one or more indicators of the dissatisfaction of at least one player of the plurality of players with the first gameplay, based on the application of one or more AI models 106 on the sensor data of the at least one player. Based on the determined one or more indicators, the circuitry 202 may control the execution of the multi-player video game to modify one or more aspects of the multi-player video game for the at least one player. For example, if a player of the plurality of players is determined to be dissatisfied with the gameplay, then one or more abilities of a game character that is controlled by the player may be enhanced.

In another embodiment, the circuitry 202 may be configured to determine one or more indicators of the dissatisfaction of each of the plurality of players with the first gameplay. In such a case, a group stress may be detected. The group stress may be an indication of a stress that the entire group (i.e., plurality of players) may be experiencing in a duration of the gaming session. The circuitry 202 may control the execution of the multi-player video game to modify one or more aspects of the multi-player video game, for each of the plurality of players, based on the detected group stress. This may be done to maintain the group stress under a common baseline stress level for each of the plurality of players. For instance, if the multi-player video game is a player-versus-player game (e.g., a team death match) where each player of the group selects a character with specific characteristic, then the group stress may be detected. The circuitry 202 may suggest changes in character selection, fighting strategy, or changes in selection of weapon or resources to assist each player of a group.

In case of the multi-player video game, a player may play the video game together as part of a team of players. In certain instances, the player may feel embarrassed or may experience low self-esteem if certain moves of the player have a negative influence on the team's success in the game and other players of the team (and opponents) can notice such moves of the player. In such instances, the circuitry 202 may adjust the one or more aspects to the multi-player video game such that the ability of a game character or an object controlled by the player may be modified. For example, such an adjustment may correspond to an increase in a resistance, or a strength of the game character controlled by the player in relation to game characters controlled by other players. Similarly, if stress is detected in the opponent team's players, then the circuitry 202 may be configured to make appropriate adjustment in the respective game characters controlled by the opponent team's players.

Figure 4:
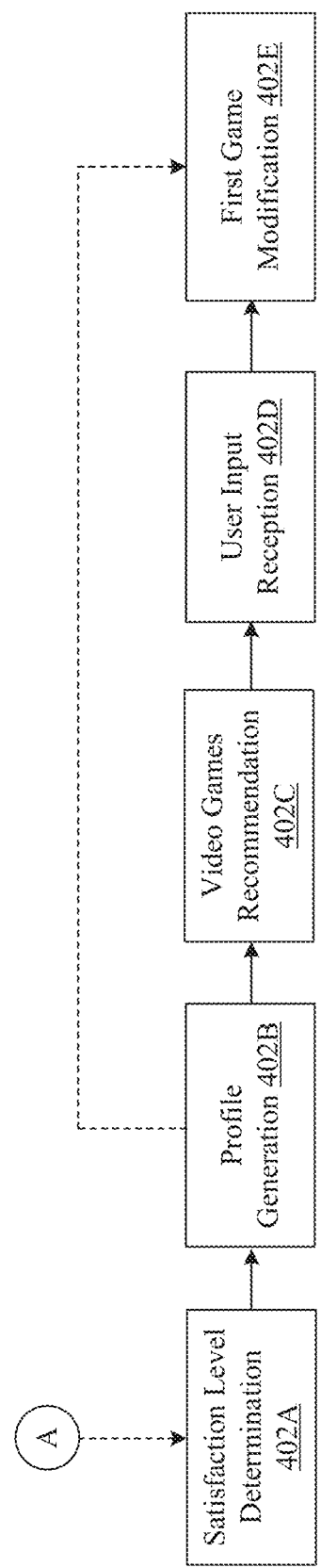
FIG. 4 is a diagram that illustrates exemplary operations for recommendation of video games to player and modification of video games, in accordance with an embodiment of the disclosure.

FIG. 4 is a diagram that illustrates exemplary operations for recommendation of video games to player and modification of video games, in accordance with an embodiment of the disclosure. FIG. 4 is explained in conjunction with elements from FIG. 1, FIG. 2, and FIG. 3. With reference to FIG. 4, there is shown a block diagram 400 that illustrates exemplary operations from 402A to 402E, as described herein. The exemplary operations illustrated in the block diagram 400 may start at 402A and may be performed by any computing system, apparatus, or device, such as by the system 102 of FIG. 1 or circuitry 202 of FIG. 2. Although illustrated with discrete blocks, the exemplary operations associated with one or more blocks of the block diagram 400 may be divided into additional blocks, combined into fewer blocks, or eliminated, depending on the implementation.

At 402A, a satisfaction level determination operation may be performed. In the satisfaction level determination operation, the circuitry 202 may be configured to determine a satisfaction level of the player 114 with the first gameplay or the video game based on analysis of the sensor data. In an embodiment, the circuitry 202 may be configured to apply the one or more AI models 106 on the acquired sensor data associated with the player 114 to determine the satisfaction level of the player 114. In an embodiment, the satisfaction level of the player 114 may be determined based on at least one of the facial expressions, the body language, the verbal tone, the physiological reaction, the emotion, one or more behavioral changes or actions of the player in the duration of the detected session, a stress level, or one or more keywords enunciated by the player within the duration of the detected gaming session. By way of example, if the facial expression indicates that the player 114 is smiling, then the player 114 may be satisfied. As another example, if the stress level is low, then the player 114 may be satisfied.

The one or more indicators of the dissatisfaction include at least one of a facial expression, a body language, a verbal tone, a physiological reaction, an emotion, one or more behavioral changes or actions of the player in the duration of the detected session, a stress level, or one or more keywords enunciated by the player within the duration of the detected gaming session. In accordance with an embodiment, the satisfaction level may indicate a level of pleasure, social interaction, and immersion that the player 114 may experience while playing the video game.

At 402B, a profile generation operation may be performed. In the profile generation operation, the circuitry 202 may be configured to generate a profile of the player 114. The profile of the player 114 may be generated based on the determined satisfaction level of the player 114 and the determined one or more indicators of the dissatisfaction of the player 114 with the first gameplay, as described at 302C of FIG. 3. In an embodiment, the profile of the player 114 may include the determined satisfaction level and the determined one or more indicators. In another embodiment, the generated profile of the player 114 may include a threshold (or a satisfaction threshold) associated with the player 114.

Specifically, the threshold may be personalized for the player 114. The threshold may be determined based on analysis of historical sensor data associated with the player 114 and/or a group of players (within a certain demography or a category). In an embodiment, the threshold (or the satisfaction threshold) may be associated with each genre of the video game. In another embodiment, the generated profile of the player 114 may include the baseline stress level of the player 114 for each genre of the plurality of video game genres. The generated profile of the player 114 may be stored on the server 108 with an identifier associated with the player 114.

In an embodiment, the circuitry 202 may be configured to utilize the profile of the player 114 in online game match making scenarios. For example, players that quickly get angry or sad in the game may not be matched with players that quickly get sad or overemotional. As another example, if one player is angry because of the performance of another player in a team, then both the players may not be included in the same team again for a new match.

At 402C, a video game recommendation operation may be performed. In the video game recommendation operation, the circuitry 202 may be configured to recommend one or more video games to the player 114, based on the generated profile. In an embodiment, the circuitry 202 may be configured to determine a first genre for which the threshold (or satisfaction threshold) may be maximum in the generated profile. The circuitry 202 may further recommend the one or more video games that may be associated with the first genre. For example, if the threshold for the action genre is maximum, then the recommended one or more games may have 'action' as the genre. In another embodiment, the recommended one or more video games may be like the video game. In another embodiment, the circuitry 202 may be configured to determine a second genre for which the threshold (or the satisfaction threshold) may be minimum in the generated profile. The circuitry 202 may be configured to not recommend the one or more video games associated with the second genre. The threshold (or the satisfaction threshold) may be a relative value or an absolute value for recommendation of the one or more video games.

In an embodiment, the generated profile of the player 114 may include a first video game for which the satisfaction level of the player 114 may be maximum. In such an embodiment, the circuitry 202 may be configured to recommend the one or more video games that are like the first video game to the player 114. In another embodiment, the circuitry 202 may be configured to determine one or more personality traits (e.g., facial expressions, body postures, and behavioral attributes) of the player 114. Based on the determined personality traits, the circuitry 202 may determine that the player 114 likes the first game. For example, if the player 114 is happy while playing the first game, then the facial expression of the player 114 may indicate that the player 114 is happy.

At 402D, a user input may be received. The circuitry 202 may be configured to receive a player input associated with a purchase of a first video game of the recommended one or more video games. In an embodiment, the first video game may be different from the video game.

At 402E, a first video game modification operation may be performed. In the first video game modification operation, the circuitry 202 may be configured to modify one or more aspects associated with a gameplay of the first video game. To modify the one or more aspects of the first video game, the circuitry 202 may be configured to load the profile of the player 114 based on the received player input as described at 402D. As discussed, the profile may indicate at least one of the satisfaction level of the player 114, the determined one or more indicators of the dissatisfaction of the player 114, and the baseline stress level for each genre. Based on the loaded profile of the player 114, the circuitry 202 may be configured to modify the one or more aspects associated with the gameplay of the first video game. In an embodiment, the one or more aspects of the first video game may be modified before or after the first video game is executed to enable a gameplay of the first video game. As discussed, the modification in the one or more aspects may include at least one of a change in one or more game states of the first video game that may be associated with the gameplay, a change in one or more attributes of a visual component included in the first video game, a change in one or more attributes of an audible component included in the first video game, and the like.

In an embodiment, the circuitry 202 may be configured to determine a baseline stress level for a team of players (may play a certain video game), based on historical and current sensor data associated with each of the team. The circuitry 202 may be further configured to change a current difficulty setting for the video game, based on a determination that the stress level of at least one player of the team is above the baseline stress level. The one or more aspects of the video game may be modified before or after the video game is executed for a gameplay of the first video game. With an increase in a count of gameplays of the player 114, the profile of the player 114 may be updated accordingly.

Figure 5A:
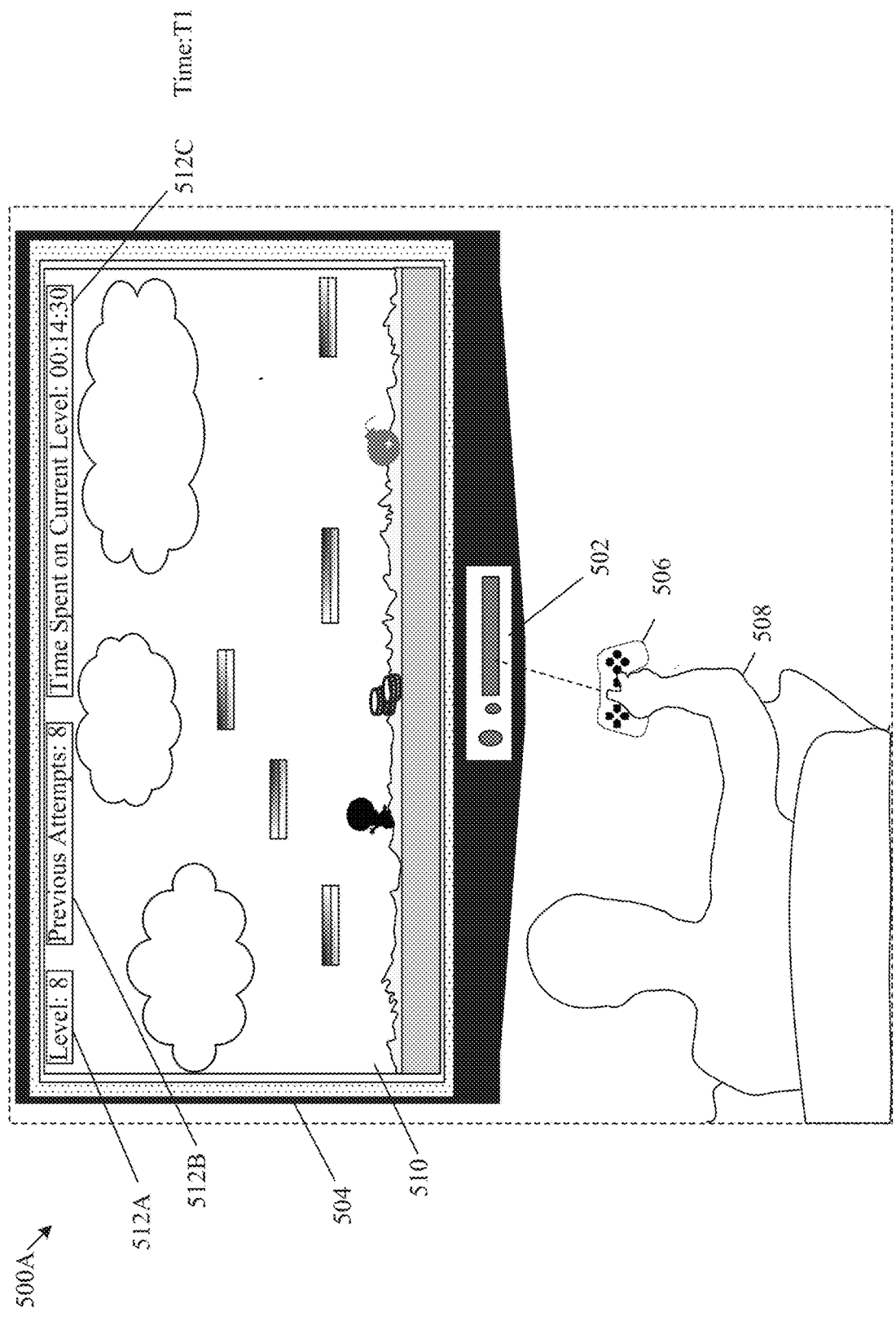
FIGS. 5A, 5B, and 5C collectively illustrates an exemplary first scenario for enhancement of gameplay experience based on analysis of player data, in accordance with an embodiment of the disclosure.
Figure 5B:
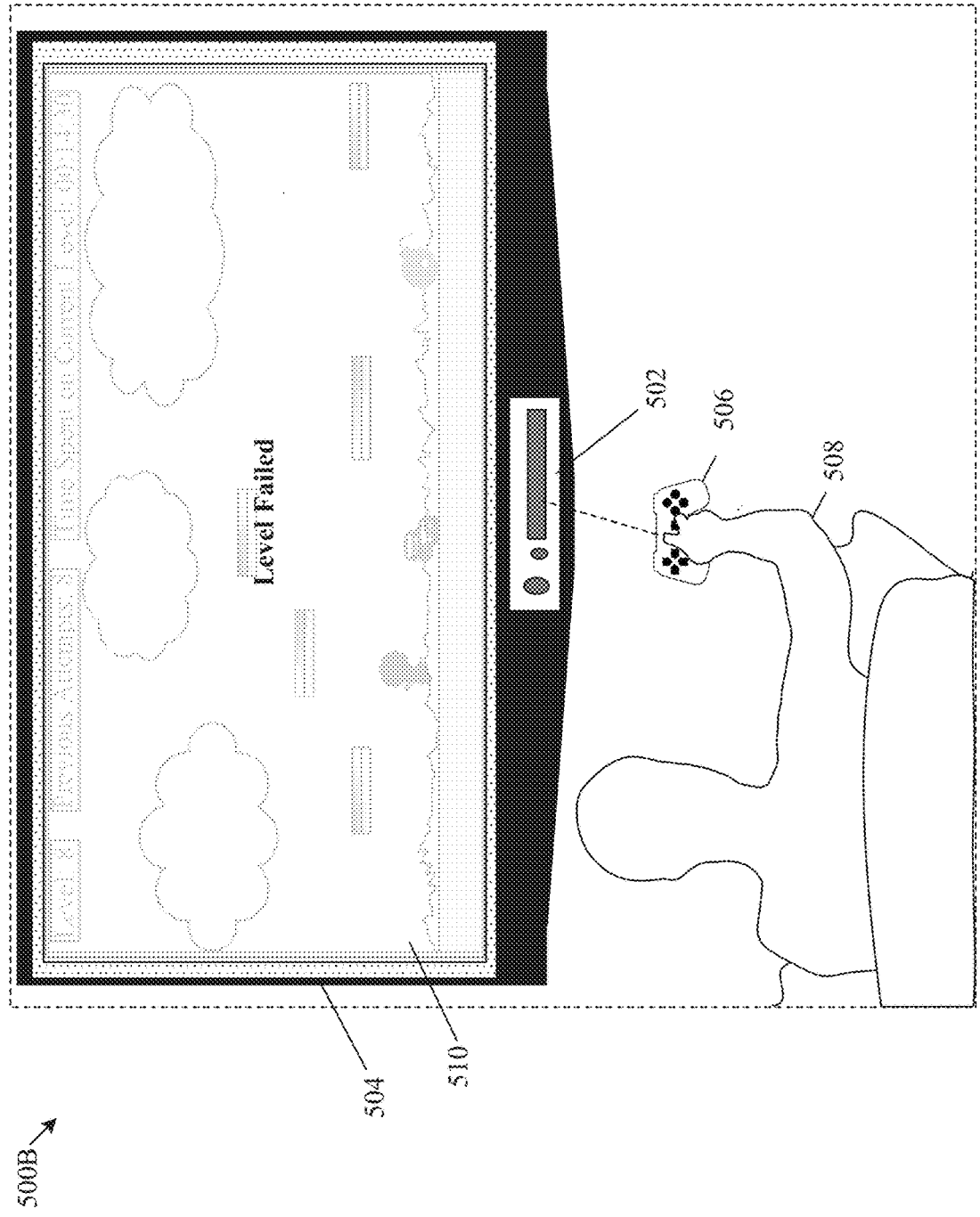
Figure 5C:
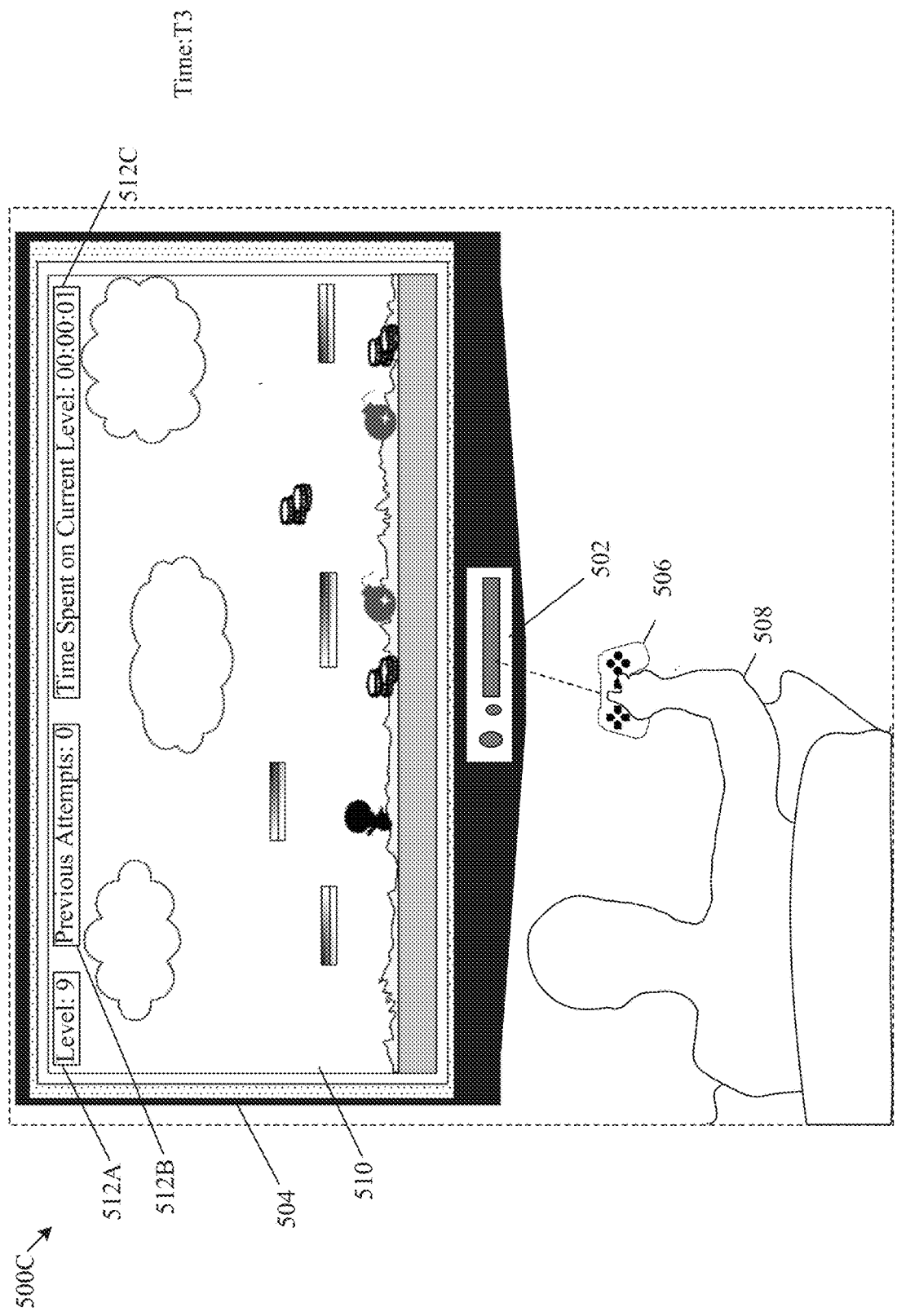

FIGS. 5A, 5B, and 5C are diagrams that collectively illustrate an exemplary scenario for enhancement of gameplay experience based on analysis of player data, in accordance with an embodiment of the disclosure. FIGS. 5A, 5B, and 5C are explained in conjunction with elements from FIG. 1, FIG. 2, FIG. 3, and FIG. 4. With reference to FIGS. 5A, 5B, and 5C, there is shown a first scenario 500A, 500B, and 500C that represents events at time T1, T2, and T3, respectively. With reference to FIGS. 5A, 5B, and 5C, there is shown a video game console 502 as an exemplary implementation of the system 102 and a television 504 as an exemplary implementation of the display device 104. There is further shown a video game controller 506 and a player 508 who plays a video game 510 on a display device (such as the television 504) using the video game controller 506.

With reference to FIG. 5A, the video game console 502 may be configured to detect a gaming session that may include an execution of the video game 510 for a first gameplay. At time T1, the player 508 may be struck at a level 8. The player 508 may have made 8 attempts to clear the level 8 and time spent on level 8 may be 14 mins and 30 seconds, as displayed on the television 504. In an embodiment, a first user interface element 512A, a second user interface element 512B, and a third user interface element 512C may be displayed on the television 504. The first user interface element 512A may be labelled as "Level" and a first value of the first user interface element 512A may indicate a current game level of the video game 510 that the player 508 may be on. The second user interface element 512B may be labelled as "Previous Attempts" and a second value of the second user interface element 512B may indicate a count of attempts made by the player 508 to complete the current game level of the video game 510 within a duration of the detected gaming session. Similarly, the third user interface element 512C may be labelled as "Time Spent on Current Level" and a third value of the third user interface element 512C may indicate a time spent by the player 508 to complete the current level of the video game 510, as indicated by the first value.

At time T2 and with reference to FIG. 5B, the video game console 502 may detect a failure in completion of the current level (i.e., level 8) by the player 508. Based on the detected failure, the video game console 502 may be configured to increment the second value associated with the second user interface element 512B by one. The updated second value of second user interface element 512B, at time T2, may be 9. Similarly, the updated third value of third user interface element 512C, at time T2, may be 15 minutes and 00 seconds. In an embodiment, the video game console 502 may be configured to increment the value associated with the second user interface element 512B by one each time the failure in completion of the current level is detected.

After each unsuccessful attempt, the video game console 502 may be configured to determine the count of attempts made by the player 508 to play (or to complete) a level (or the current level) of the video game 510. Based on determined count of the attempts, the video game console 502 may be configured to retrieve a count threshold associated with the current level of the video game 510. The count threshold may be a numerical value and may correspond to a maximum number of attempts that the player 508 may be allowed to make to complete the current level. Any count of attempts that exceeds the count threshold may likely result in a dissatisfaction or other game withdrawal symptoms in the player 508. In accordance with an embodiment, the count threshold may be determined based on analysis of sensor data associated with a plurality of players who may have played the current level (i.e., Level 8) of the video game 510.

The video game console 502 may be further configured to compare the determined count with the count threshold. In case the determined count is less than or equal to the count threshold, the video game console 502 may be configured to restart the current level of the video game 510. In case the determined count is greater than the count threshold, the video game console 502 may be configured to control the execution of the video game 510. The execution of the video game 510 may be controlled to modify one or more rules associated with the level of the video game 510 or a current game state associated with the level of the video game 510. For example, the current game state may be modified such that the player 508 is able to skip tasks that may have caused the player 508 to fail the current level. An example of such tasks may be to defeat an AI enemy in the video game 510. Details on control of the execution of the video game 510 are further provided, for example, in FIG. 5C.

In another embodiment, the video game console 502 may be configured to determine the time spent by the player 508 in the current level of the video game 510. Based on determined duration, the video game console 502 may be configured to retrieve a threshold time associated with the current level of the video game 510. The threshold time may correspond to maximum duration that the player 508 may be allowed take to complete the current level. A duration of gameplay in the current level that exceeds the threshold time may likely result in a dissatisfaction or other game withdrawal symptoms in the player 508. In an embodiment, the threshold time may be determined based on analysis of sensor data associated with a plurality of players who may have played the current level of the video game 510.

The video game console 502 may be further configured to compare the determined time spent with the threshold time. In an embodiment, the determined time spent may be less than or equal to the threshold time. In such a scenario, the video game console 502 may be configured to restart the current level of the video game 510. In another embodiment, the determined time spent may be greater than the threshold time. In such a scenario, the video game console 502 may be configured to control the execution of the video game 510. The execution of the video game 510 may be controlled to modify the one or more rules associated with the level of the video game 510 or the current game state associated with the level of the video game 510. Details on control of the execution of the video game 510 are provided, for example, in FIG. 5C.

At time T3, the video game console 502 may be configured to the modify one or more rules associated with the level of the video game 510 or the current game state associated with the level of the video game 510. Specifically, the one or more rules associated with the level of the video game 510 may be associated with various aspects of the level of the video game 510. Such aspects may include, for example, a length of the level, a time limit to complete the level, several enemies in the level, a number of powers for a character of the player 508, an alternate level or task in the current level, and the like. Similarly, the current game state associated with the level of the video game 510 may indicate a snapshot (including player resources) of the video game 510 at any given point in time. For example, in an action-adventure game, the game state may correspond to a save game where the player 508 may be at a specific location and is supposed to fight a specific enemy with a particular health-bar. A change in the game state may correspond to changes in the player resources, changes in other objects (e.g., enemy players) and their attributes (such as health-bar, aggressive behavior, and powers), a number of obstacles in the path to complete the level, one or more powers associated with the game character controlled by the player 508, and the like.

With reference to FIG. 5C, the video game console 502 may be the configured to modify one or more rules associated with the level of the video game 510 to skip the current level (i.e., Level 8) of the video game 510 and redirect the player 508 to a next level (i.e., Level 9) of the video game 510. The video game console 502 may further control the television 504 to display the next level on the television 504. In an embodiment, the current level (i.e., level 8) may be marked as completed or skipped, as part of gameplay stats of the player 508 for the video game 510.

In an embodiment, the circuitry 202 may be configured to provide the determined count and the determined time spent, along with the acquired sensor data, as an input to the one or more AI models 106. Based on the application of the one or more AI models 106 on the input, it may be determined that the player 508 is satisfied even after the determined count and the time spent. For example, the player may be enjoying the challenges in the current level of the video game 510. In such a scenario, the system 102 may not skip the current level of the video game 510. This may be done to enhance the satisfaction level of the player 508.

Figure 6A:
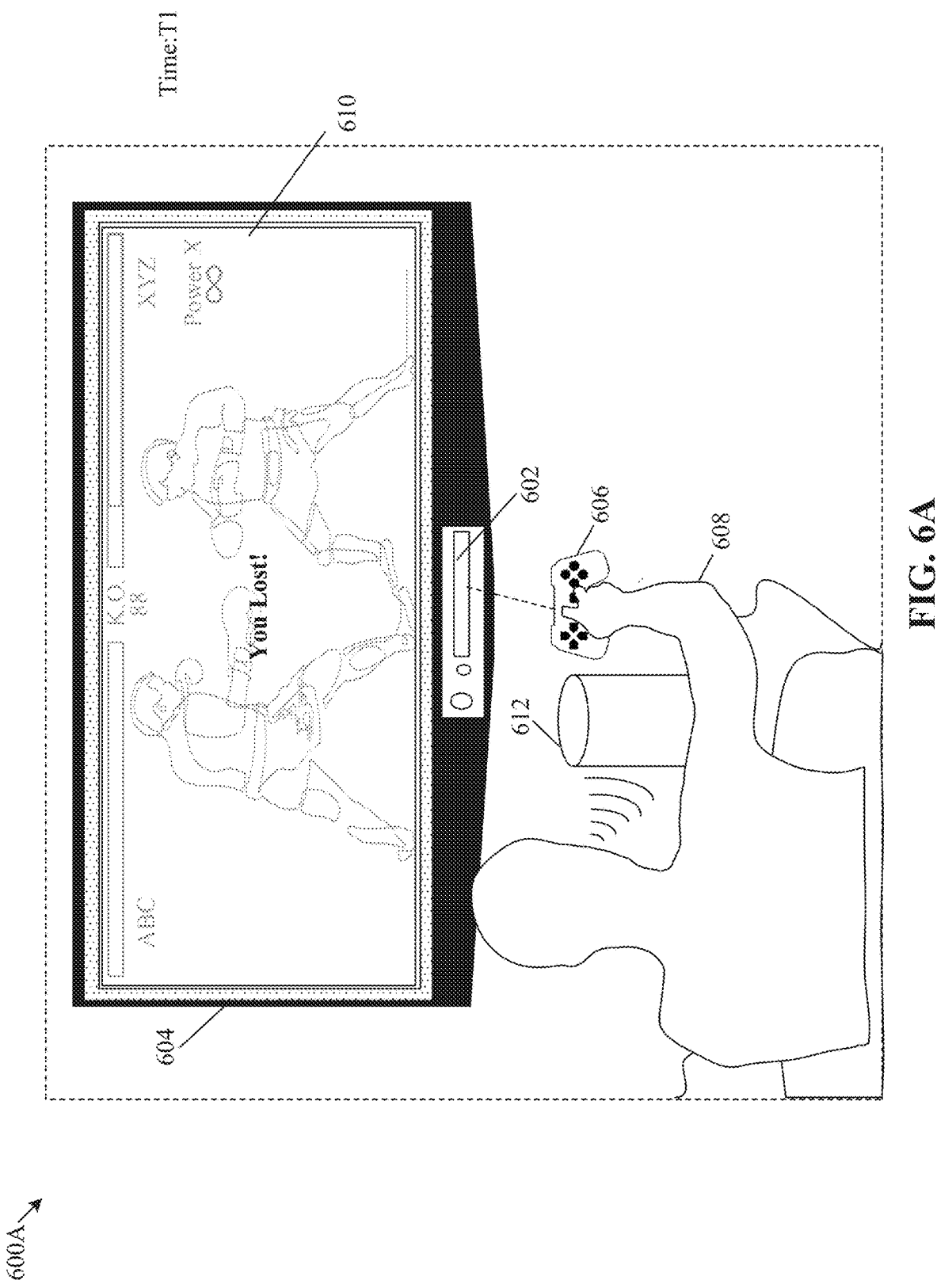
FIGS. 6A, and 6B collectively illustrates an exemplary second scenario for enhancement of gameplay experience based on analysis of player data, in accordance with an embodiment of the disclosure.
Figure 6B:
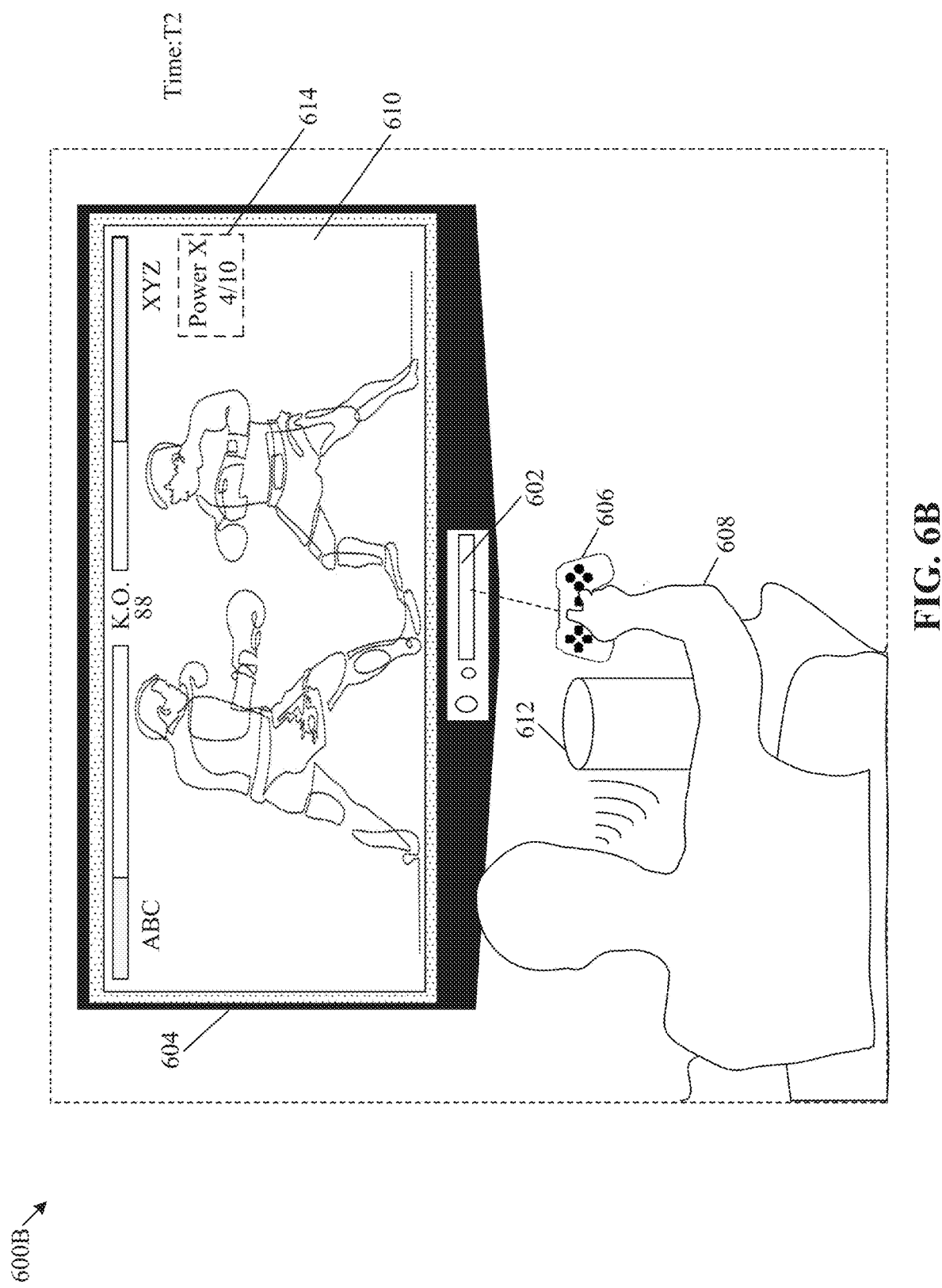

FIGS. 6A and 6B are diagrams that collectively illustrate an exemplary scenario for enhancement of gameplay experience based on analysis of player data, in accordance with an embodiment of the disclosure. FIGS. 6A, and 6B are explained in conjunction with elements from FIG. 1, FIG. 2, FIG. 3, FIG. 4, FIG. 5A, FIG. 5B, and FIG. 5C. With reference to FIGS. 6A, and 6B, there is shown a second scenario 600A and 600B that corresponds to events at time T1 and T2, respectively. With reference to FIGS. 6A, and 6B, there is shown a video game console 602 as an exemplary implementation of the system 102 and a television 604 as an exemplary implementation of the display device 104. There is further shown a video game controller 606 and a player 608 who is playing a video game 610 on a display device (such as the television 604) using the video game controller 606. Also, in FIGS. 6A, and 6B, there is shown a microphone 612 that may be included in the one or more sensors 112 of FIG. 1.

With reference to FIG. 6A and at time T1, the video game console 602 may be configured to detect a gaming session that may include an execution of the video game 610 for a first gameplay. Within the duration of the gaming session, the video game console 602 may be configured to detect a failure in a completion of a level of the video game 610 by the player 608. Based on the detection of the failure, the video game console 602 may be configured to control a microphone 612 to capture audio of the player 608. The audio of the player 608 may include content that indicates a cause of the failure in the completion of the level. For example, if the video game 610 is a fighting game, an opponent's game character may have a special power "X" that the opponent's game character may use repeatedly and many times to defeat the game character controlled by the player 608. Due to repetitive usage of the special power "X", the player 608 may say "I need to tackle this special power X of the opponent's game character" or "I am sick of the special power X", and the like.

The microphone 612 may capture the audio (including the speech) of the player 608 within the duration of the detected gaming session and may transmit the captured audio to the video game console 602, via the communication network 110. The video game console 602 may acquire the captured audio from the microphone 612. In an embodiment, the captured audio may correspond to the sensor data. The video game console 602 may be further configured to apply the first AI model 210A of the one or more AI models 106 on the capture audio. As discussed in FIG. 2, the first AI model 210A may be a natural language processing model that may be pre-trained to detect one or more keywords associated with one or more causes of the failure in completion of the level. The video game console 602 may determine one or more causes of the failure based on the detected one or more keywords.

Based on the determined one or more causes (which may be an indicator of dissatisfaction of the player 608 with the first gameplay), the video game console 602 may be configured to control the execution of the video game 610. The execution of the video game 610 may be controlled to modify one or more rules associated with the level of the video game 610 or a current game state associated with the level of the video game 610.

By way of example, and not limitation, the video game console 602 may modify the ability of the opponent's game character to use the special power "X" only a limited number of times (e.g., 10 times in the entire fight). As shown in FIG. 6B, a user interface element 614 may be displayed on the television 604 that may indicate a count of usage of the special power "X" by the opponent's game character.

In an embodiment, the video game controller 606 may be communicatively coupled to video game console 602. Based on the detected gaming session, the video game console 602 may be configured to control a pressure sensor of the one or more sensors associated with the video game controller 606 to capture a pressure exerted by the player 608 on keys or joysticks of the video game controller 606, within the duration of the detected gaming session. The pressure exerted by the player 608 on the keys or the joystick of the video game controller 606 may indicate how hard the keys are pressed or the joystick is manipulated. In an embodiment, the circuitry 202 may be further configured to determine a keystroke pattern based on the acquired sensor data. The keystroke pattern may store a sequence of keystrokes made by the player 608 during the first gameplay.

The video game controller 606 may be further configured to compare the captured pressure with a pressure threshold. The pressure threshold may be a baseline pressure that any player is expected to exert under a normal gameplay session. For example, the pressure threshold may be an average of a maximum pressure that may be exerted by a plurality of players on different keys while playing a particular video game or games of a particular genre. In an embodiment, the pressure threshold may be determined based on historical pressure data exerted by the plurality of players while playing the current level of the video game 610. The video game controller 606 may be configured to transmit a signal to the video game console 602 to control the execution of the video game 610, based on the comparison and/or the determined keystroke pattern. In an embodiment, in addition to the pressure and the keystroke pattern, the accelerometer sensor installed in the video game controller 606 may be configured to detect if the player is agitating the video game controller 606 unnecessarily/randomly showing, for instance, impatience or anger.

In accordance with an embodiment, the captured pressure may be less than the pressure threshold. In such a scenario, the video game controller 606 may transmit a first signal to the video game console 602 to skip any modification in the execution of the video game 610. In another embodiment, the captured pressure may be greater than the pressure threshold. In such a scenario, it may be determined that the player 608 may be under stressed and may be angry with certain aspects of the gameplay. The video game controller 606 may transmit a second signal to the video game console 602 to control the execution of the video game 610. As discussed, the control of the execution of the video game 610 may correspond to a modification of the one or more aspects associated with the first gameplay or a second gameplay that may be different from the first gameplay. In case the captured pressure is greater than the pressure threshold, the video game controller 606 may be configured to provide feedback to the player 608. For example, the feedback may include an audio such as an alert sound (which may prompt the player 608 to pause the gameplay). As another example, the settings that turn on or set intensity of the haptic feedback of the video game controller 606 may be turned off or set to a low value (i.e., below a threshold).

In accordance with another embodiment, the video game controller 606 may include multiple buttons such as action buttons, direction buttons, sticks, triggers, and touch pad buttons. In such a scenario, the circuitry 202 may be configured to determine a pressure pattern and an amount of pressure exerted on one or more buttons of the video game controller 606. The captured pressure pattern and amount of pressure may be provided as input to a neural network model that may be trained to determine whether the pressure pattern and the amount of the pressure exerted on one or more buttons indicates the dissatisfaction of player 608. In an embodiment, the neural network model may be trained to return a continuous value that may represent a deviation of the current pressure pattern and an amount of pressure exerted by the player 608 from a normal pressure pattern and a normal amount of pressure on the buttons, respectively. The normal pressure pattern and the normal amount of pressure may be treated as a baseline of satisfaction of the player 608 with the gameplay.

Figure 7A:
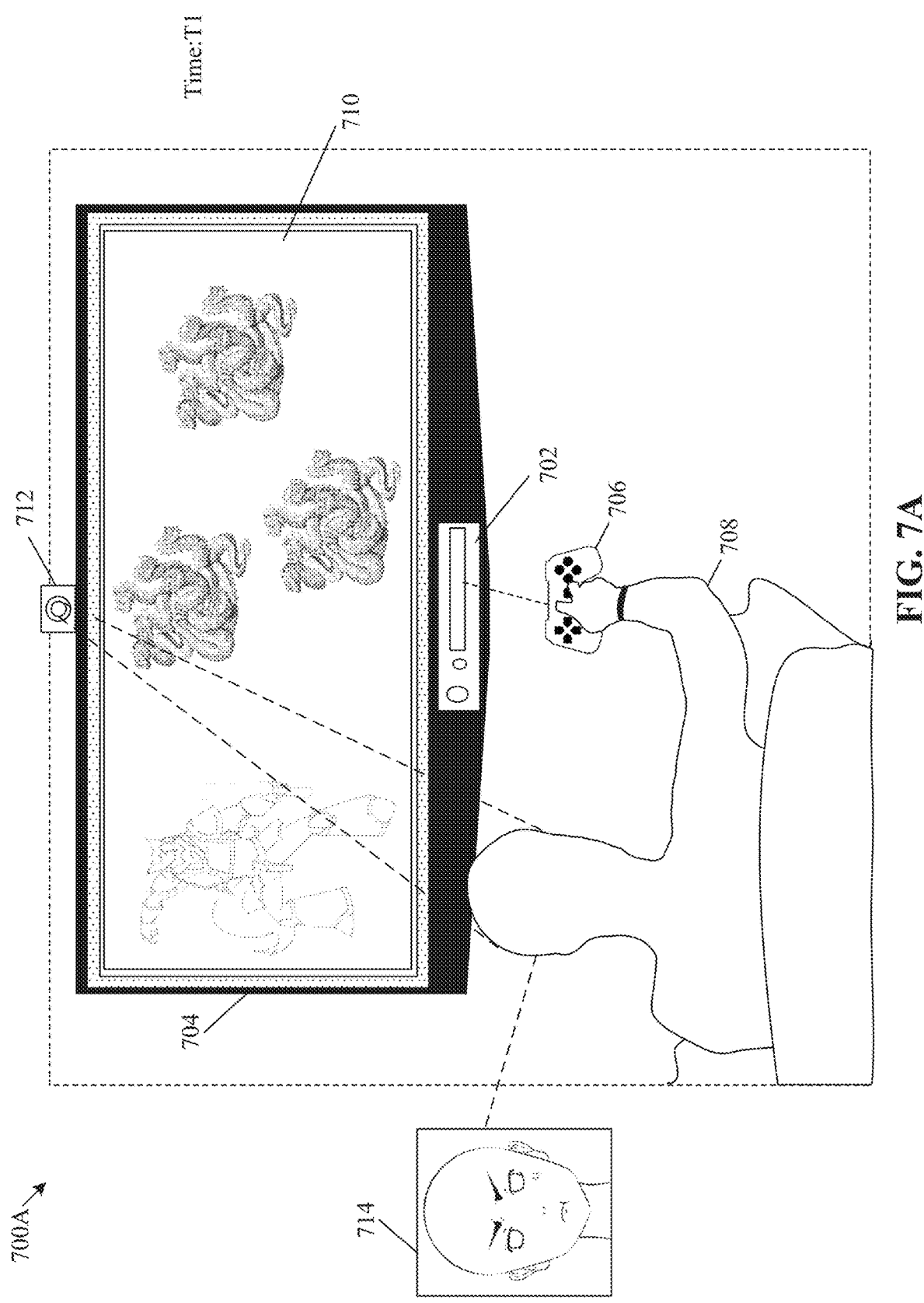
FIGS. 7A, and 7B collectively illustrates an exemplary third scenario for enhancement of gameplay experience based on analysis of player data, in accordance with an embodiment of the disclosure.
Figure 7B:
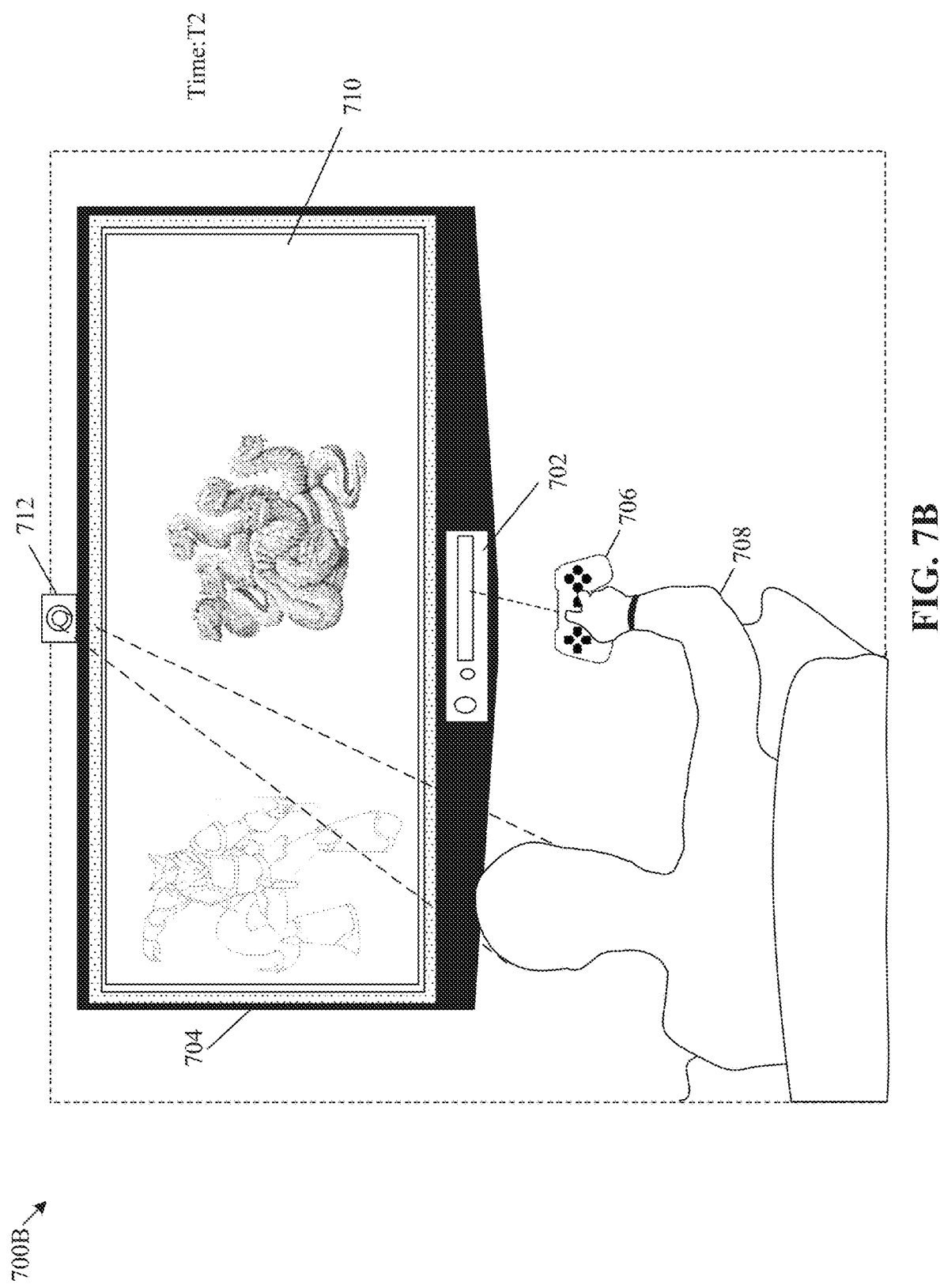

FIGS. 7A and 7B are diagrams that collectively illustrate an exemplary scenario for enhancement of gameplay experience based on analysis of player data, in accordance with an embodiment of the disclosure. FIGS. 7A and 7B are explained in conjunction with elements from FIG. 1, FIG. 2, FIG. 3, FIG. 4, FIG. 5A, FIG. 5B, FIG. 5C, FIG. 6A, and FIG. 6B. With reference to FIGS. 7A and 7B, there is shown a third scenario 700 which depicts a video game console 702 and a television 704. The video game console 702 may be an exemplary implementation of the system 102 and the television 704 may be an exemplary implementation of the display device 104. There is further shown a video game controller 706 and a player 708 who may be playing a video game 710 on a display device (such as the television 704) using the video game controller 706. Also, in FIGS. 7A and 7B, there is shown an image sensor 712 of the one or more sensors 112 of FIG. 1.

With reference to FIG. 7A and at time T1, the video game console 702 may be configured to detect a gaming session that may include an execution of the video game 710 for a first gameplay. Based on the detection of the gaming session, the video game console 702 may be configured to control the image sensor 712 of the one or more sensors to capture an image 714 of the player 708 within the duration of the detected gaming session. The video game console 702 may receive the captured image 714 from the image sensor 712 and may apply the second AI model 210B of the one or more AI models 106 on the captured image 714. As discussed in FIG. 2, the second AI model 210B may a pre-trained model that may be configured to determine an emotional state of the player 708 from the captured image 714 of the player 708. The video game console 702 may be configured to determine the emotional state of the player 708 based on the application of the second AI model 210B. The determined emotional state of the player 708 may correspond to one of an aggravated state, an agitated state, an aggressive state, an amazed state, an ambitious state, an anger state, an astonished state, a confident state, a confused state, a dejected state, a disgust state, a fear state, a sad state, a proud state, a satisfied state, a puzzled state, a happy state, a hyper state, a distressed state, an embarrassed state, a neural state, an envy state, a surprise state, a thrilled state, a worried state, and the like.

The video game console 702 may be further configured to control the execution of the video game 710 based on the determined emotional state of the player 708. By way of example, and not limitation, if the determined emotional state of the player 708 is angry, aggravated, agitated or aggressive, then the video game console 702 may reduce a count of the game characters associated with an opponent. As shown in FIG. 7B, the count of the game characters associated with the opponent may be reduced from 3 (in FIG. 7A) to 1 as it may be easy to defeat 1 game character as compared to 3 game characters. In another embodiment, the video game console 702 may decrease a difficult level of the video game 710 and may restart the video game 710 from the current level. In another embodiment, if the determined emotional state of the player 708 is happy, satisfied, or proud, then the video game console 702 may increase a count of the game characters associated with the enemy in a next level after the current level.

In an embodiment, the video game console 702 may be configured to classify determined emotional state of the player 708 into levels or combinations of the neutral state, the anger state, the disgust state, the fear state, the sad state, the happy state, or the surprise state. The induced stress may be associated to one of the neutral state, the anger state, the disgust state, the fear state, the sad state, the happy state or the surprise state or a combination of the neutral state, the anger state, the disgust state, the fear state, the sad state, the happy state, or the surprise state. If the player 708 is a child, then it is possible that the player 708 may experience fear due to a certain sound or a visual aspect(s) of the video game 710. The stress induced in the player 708 may be due to the fear. In such a scenario, the circuitry 202 may be configured to modify the one or more aspects (e.g., related to the sound or the visual aspect) of the video game 710 that may have induced the fear. In some scenarios, the modification of the one or more aspects of the video game 710 may downgrade the gaming experience of the player 708. The disclosed video game console 702 may be capable of determining a cause of the induced stress at a granular level to enhance the gaming experience as well as the satisfaction level of the player 708.

In accordance with an embodiment, the video game console 702 may be configured to control the image sensor 712 of the one or more sensors to continuously capture a set of images of the player 708 within the duration of the detected gaming session. Based on the captured set of images, the video game console 702 may be configured to track a movement of an eye of the player 708 in the captured set of images. The video game console 702 may be further configured to determine a region on the television 704 (or a display screen) where the player may be looking, based on the tracked movement of the eye. Based on the determined region, the video game console 702 may be configured to control the execution of the video game 710 to adjust one or more rules or a game state associated with the level of the video game 710. By way of example, and not limitation, if the determined region corresponds to a location on a route or path (i.e., an in-game element) that the player needs to take, then the circuitry 202 may be configured to move the game character, controlled by the player 708, from its current position to a specific position within the determined region.

In an embodiment, the system 102 may be configured to detect a fatigue of the player 708 based on the audio spoken by the player 708, a captured set of images, a captured pressure, and the like. In case the fatigue is detected, the system 102 may be configured to suggest one or more actions such as to pause the gameplay to overcome the fatigue.

It should be noted that the image sensor 712 in FIG. 7A and FIG. 7B is presented merely as an example of the one or more sensors 112. The present disclosure may also include to other types of sensors, such as a depth sensor and the three-dimensional (3D) scanner. A description of other types of sensors has been omitted from the disclosure for the sake of brevity.

In an embodiment, the system 102 may be configured to control the execution of the video game 710 based on sensor data acquired from multiple other sensors such as the depth sensor, the heart rate sensor, the accelerometer sensor, the temperature sensor, the sweat sensor, the haptic sensor, the three-dimensional (3D) scanner, or the brain controlled interface. As an example, if the sensor data captured by the heart rate sensors indicates that the heart rate of the player 708 is increasing during the first gameplay, then the circuitry 202 may control the execution of video game 710 to modify one or more aspects associated with the first gameplay or a second gameplay of the video game 710 that may be different from the first gameplay. Similarly, if the sensor data captured by the temperature sensor and sweat sensor indicates that the temperature of the body of the player 708 and amount of sweat produced by the body of the player 708 is increasing during the first gameplay, then the circuitry 202 may control the execution of video game 710 to modify one or more aspects associated with the first gameplay or the second gameplay of the video game 710 that may be different from the first gameplay.

In an embodiment, the sensor data captured by the 3D scanner may indicate various movements of the player 708 during the first gameplay. For example, if the player 708 is unhappy and punches on a wall or a desk, then such actions may indicate that the player 708 is unhappy or dissatisfied with the gameplay and is likely under stress. The circuitry 202 may then control the execution of the video game 710 to modify one or more aspects associated with the first gameplay or the second gameplay of the video game 710 that may be different from the first gameplay, based on such actions. Description of such sensor data captured by each of the one or more sensors 112 has been omitted from the disclosure for the sake of brevity.

In another embodiment, the video game console 702 may be configured to determine a cause of the dissatisfaction of the player 708 with the first gameplay. To determine the cause of the dissatisfaction, the video game console 702 may be configured to analyze emotions associated with the player 708 in a duration of the first gameplay, the acquired sensor data, and/or a pressure pattern (also known as a keystrokes pattern). The circuitry 202 may be further configured to modify the one or more aspects of the video game 710 based on the determined cause. The one or more aspects of the video game 710 may be modified in to eliminate or mitigate the cause of the dissatisfaction for subsequent sessions of gameplay.

In an embodiment, the system 102 may be configured to determine whether the video game (that the player is playing) is suitable for the player 708. Specifically, the system 102 may be configured to determine a classification (such as content rating system) of the video game is suitable for the player based on an age of the player. In case the video game is not suitable for the player 708, the system 102 may be configured stop the execution of the video game and may recommend one or more alternative video games that may be similar to the video game and suitable for the player 708. Thus, the disclosed system 102 may act as a parental control system that may be configured to execute the video games that may be suitable for the player 708.

In an embodiment, T1 and T2 may represent times that define two separate gameplays of same part of the game, or two different times in the same gameplay. In case the T1 and T2 represents different times of the same gameplay, the system 102 may be configured to evaluate a performance of the player 708 at T1. Even if the player 708 is succeeding, the system 102 may infer that the player 708 will probably fail fighting a boss later in the video game (say at time T2). The system 102 may be configured to control execution of video game based on the evaluation before the player 708 fails. For instance, at time T1, the system 102 may observe that the player 708 is fighting regular enemies. As the player 708 approaches the boss of the area at time T2, the system 102 may infer that the player 708 will probably fail and may calibrate one or more characteristics (such as life, strength, stamina, powers, and so on) of the boss to help the player 708 beat the boss.

In another embodiment, the system 102 may be configured to store the first gameplay of a specific duration (e.g., 5 minutes). The system 102 may apply the one or more AI models 106 on the stored first gameplay. Based on the application of the one or more AI models 106 on the stored first gameplay, the circuitry 202 may be configured to control the execution of the video game. For instance, in a shooter video game, a pattern of one or more enemies, in a recorded video, may be recognized to determine enemies that pose a greater threat to the player 708 as compared to other enemies in the game. In such a scenario, a hint may be displayed to the player 708 in terms of a message, a picture of "your worst enemy", or a replay of the scenes that may be causing a systematic failure of the player 708. This may help the player 708 to decide if and when the player 708 needs to avoid unnecessary confrontation with specific enemies.

Figure 8:
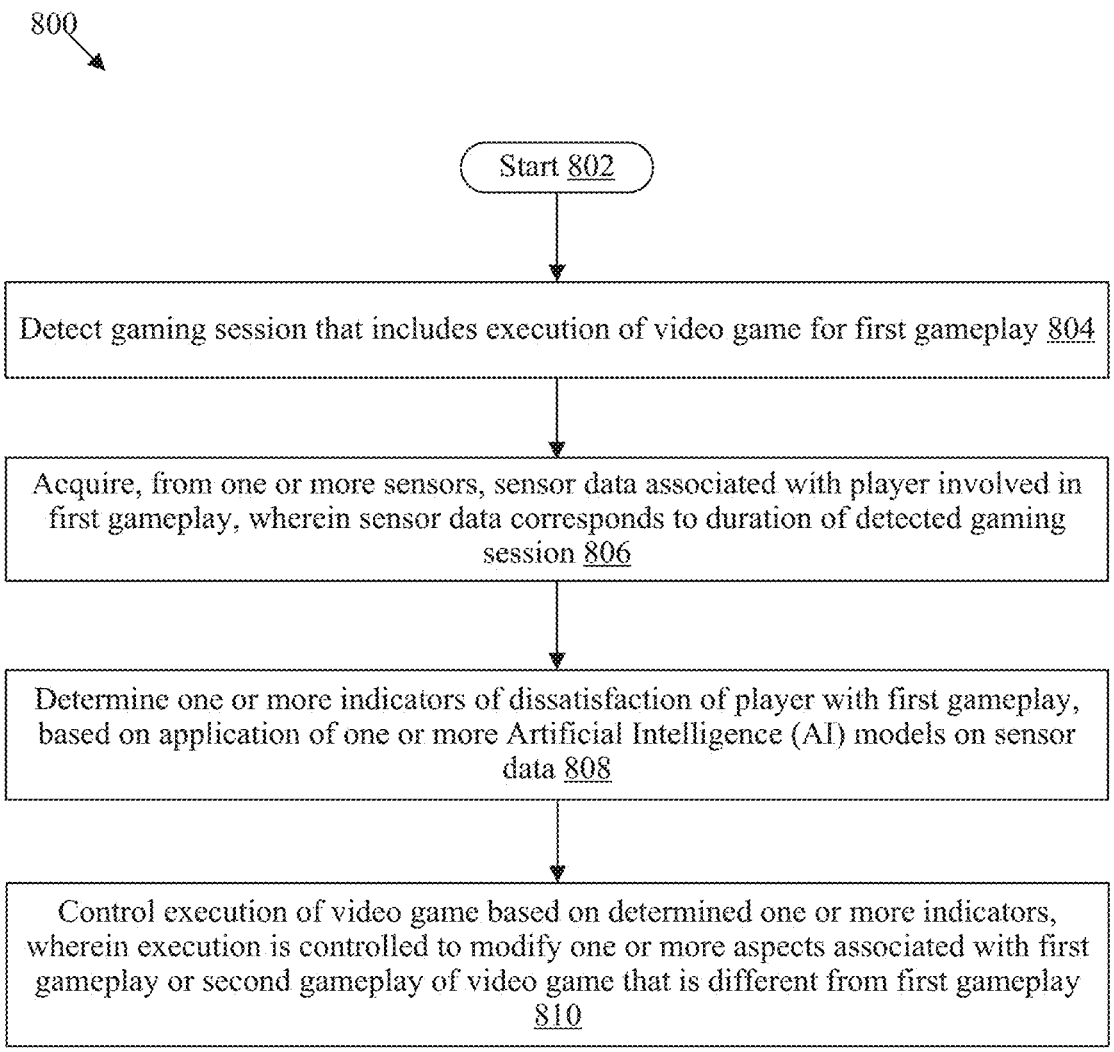
FIG. 8 is a flowchart that illustrates an exemplary method of enhancement of satisfaction level of a player during gameplay, in accordance with an embodiment of the disclosure.

FIG. 8 is a flowchart that illustrates an exemplary method of enhancement of satisfaction level of a player during gameplay, in accordance with an embodiment of the disclosure. FIG. 5 is explained in conjunction with elements from FIG. 1, FIG. 2, FIG. 3, FIG. 4, FIG. 5A, FIG. 5B, FIG. 5C, FIG. 6A, FIG. 6B, FIG. 7A and FIG. 7B. With reference to FIG. 8, there is shown a flowchart 800. The operations of the flowchart 800 may start at 802 and may proceed to 804.

At 804, a gaming session that may include an execution of the video game for a first gameplay may be detected. In at least one embodiment, the circuitry 202 may be configured to detect a gaming session that includes an execution of the video game for a first gameplay.

At 806, the sensor data associated with the player 114 involved in the first gameplay may be acquired from one or more sensors and the sensor data may correspond to a duration of the detected gaming session. In at least one embodiment, the circuitry 202 may be configured to acquire, from the one or more sensors 112, the sensor data associated with the player 114 involved in the first gameplay, wherein the sensor data corresponds to the duration of the detected gaming session.

At 808, the one or more indicators of the dissatisfaction of the player 114 with the first gameplay may be determined based on application of one or more AI models 106 on the sensor data. In at least one embodiment, the circuitry 202 may be configured to determine the one or more indicators of the dissatisfaction of the player 114 with the first gameplay based on application of one or more Artificial Intelligence (AI) models 106 on the sensor data.

At 810, the execution of the video game may be controlled based on the determined one or more indicators to modify one or more aspects associated with the first gameplay or a second gameplay of the video game that may be different from the first gameplay. In at least one embodiment, the circuitry 202 may be configured to control the execution of the video game based on the determined one or more indicators wherein the execution may be controlled to modify the one or more aspects associated with the first gameplay or a second gameplay of the video game that is different from the first gameplay. Control may pass to end.

Various embodiments of the disclosure may provide a non-transitory computer-readable medium and/or storage medium having stored thereon, instructions executable by a machine and/or a computer (or computer-executable instructions) to operate a system (e.g., the system 102) for enhancement of satisfaction level of a player during gameplay. The instructions may cause the machine and/or computer to perform operations that include detecting a gaming session that includes an execution of a video game (e.g., the video game) for a first gameplay. The operations further include acquiring sensor data associated with a player (e.g., the player 114) involved in the first gameplay. The sensor data may correspond to a duration of the detected gaming session. The operations may further include determining one or more indicators of a dissatisfaction of the player with the first gameplay based on application of one or more Artificial Intelligence (AI) models (e.g., the one or more AI models 106) on the sensor data. The operations may further include controlling the execution of the video game based on the determined one or more indicators. The execution may be controlled to modify one or more aspects associated with the first gameplay or a second gameplay of the video game that may be different from the first gameplay.

Certain embodiments of the disclosure may be found in a system and a method for enhancement of satisfaction level of a player during gameplay. Various embodiments of the disclosure may provide the system 102 that may include the circuitry 202 configured to detect a gaming session that includes the execution of the video game for the first gameplay. The circuitry 202 may be configured to acquire the sensor data associated with the player 114 involved in the first gameplay from the one or more sensors 112. The sensor data may correspond to the duration of the detected gaming session. The circuitry 202 may be further configured to determine one or more indicators of a dissatisfaction of the player 114 with the first gameplay based on the application of one or more Artificial Intelligence (AI) models 106 on the sensor data. The circuitry 202 may be further configured to control the execution of the video game based on the determined one or more indicators. The execution may be controlled to modify the one or more aspects associated with the first gameplay or the second gameplay of the video game that may be different from the first gameplay.

In accordance with an embodiment, the modification in the one or more aspects may include at least one of a change in one or more game states of the video game that are associated with the first gameplay or the second gameplay, a change in one or more attributes of a visual component included in the video game, a change in one or more attributes of an audible component included in the video game, an activation of a hint or a guide for a level or a segment of the first gameplay or the second gameplay, an activation of an option to skip the level or the segment of the first gameplay or the second gameplay, and an activation of an alternate route to complete the level or the segment of the first gameplay or the second gameplay.

In accordance with an embodiment, the one or more sensors may include at least one of a camera sensor, a depth sensor, a microphone, a pressure sensor, a heart rate sensor, an accelerometer sensor, a temperature sensor, a sweat sensor, a humidity sensor, a haptic sensor, a three-dimensional (3D) scanner, or a brain controlled interface.

In accordance with an embodiment, the one or more indicators of the dissatisfaction may include at least one of a facial expression, a body language, a verbal tone, a physiological reaction, an emotion, one or more behavioral changes or actions of the player in the duration of the detected session, a stress level, or one or more keywords enunciated by the player within the duration of the detected session.

In accordance with an embodiment, the circuitry 202 may be configured to determine a satisfaction level of the player with the first gameplay or the video game based on analysis of the sensor data. The circuitry 202 may be further configured to generate a profile of the player based on the determined one or more indicators and the determined satisfaction level and further recommend one or more video games to the player, based on the generated profile. In an embodiment, the circuitry 202 may be further configured to compare the satisfaction level of the player with a threshold, wherein the threshold may be personalized for the player 114. The circuitry 202 may be further configured to control the execution of the video game further based on the comparison. In another embodiment, the system 102 may be configured to determine a degree of affinity (or relevance) of the player 114 towards the video game. Based on the determined degree of affinity (or relevance) of the player 114 towards the video game, the circuitry 202 may be further configured to control the execution of the video game.

In accordance with an embodiment, the circuitry 202 may be configured to receive a first player input associated with a purchase of a first video game. The circuitry 202 may be further configured to determine a profile of the player. The profile may indicate at least one of the satisfaction level of the player 114 or the determined one or more indicators of the dissatisfaction of the player 114. The circuitry 202 may be further configured to modify the one or more aspects associated with a gameplay of the first video game before an execution of the first video game based on the determined profile.

In accordance with an embodiment, the circuitry 202 may be configured to determine, within the duration of the detected gaming session, a time spent by the player in a level of the video game. The circuitry 202 may be further configured to compare the determined time spent with a threshold time and further control the execution of the video game to adjust one or more rules or a game state associated with the level of the video game based on the comparison.

In accordance with an embodiment, the circuitry 202 may be configured to determine a count of attempts made by the player 114 to play a level of the video game. The circuitry 202 may be further configured to compare the determine count with a count threshold and further control the execution of the video game to adjust one or more rules or a game state associated with the level of the video game based on the comparison.

In accordance with an embodiment, the circuitry 202 may be configured to detect a failure in a completion of a level of the video game by the player 114. The circuitry 202 may be configured to control the microphone 612 to capture audio spoken the player within the duration of the detected gaming session. The circuitry 202 may be further configured to apply the first AI model 210A of the one or more AI models 106 on the capture audio. The first AI model 210A may be the natural language processing model. The circuitry 202 may be further configured to determine one or more causes for the failure in the completion of the second mission. The circuitry 202 may be further configured to control the execution of the video game to adjust one or more rules or a game state associated with the level of the video game based on the determined one or more causes.

In accordance with an embodiment, the circuitry 202 may be configured to control the image sensor 712 of the one or more sensors to capture the image 714 of the player 708 within the duration of the detected gaming session. The circuitry 202 may be further configured to receive the captured image 714 from the image sensor 712. The circuitry 202 may be further configured to apply the second AI model 210B of the one or more AI models 106 on the captured image 714. The second AI model 210B may be pre-trained to determine an emotional state of the player 708 within the duration of the detected gaming session. The circuitry 202 may further determine the emotional state of the player based on the application of the second AI model 2108. The circuitry 202 may be further configured to control the execution of the video game 710 based on the determined emotional state.

In accordance with the embodiment, the circuitry 202 may be configured to determine a video game genre of the video game. The circuitry 202 may be configured to determine a baseline stress level of the player 114 for each video game genre of a plurality of video game genres. The circuitry 202 may be further configured to control the execution of the video game based on the determined video game genre and the determined baseline stress level.

In accordance with the embodiment, the system 102 may include the video game controller 706 coupled with the circuitry 202. The video game controller 706 may be further configured to control the pressure sensor associated with the video game controller 706 to capture pressure exerted by the player 708 on the video game controller 706 within the duration of the detected gaming session. The circuitry 202 may be further configured to compare the captured pressure with a pressure threshold. The circuitry 202 may be further configured to transmit a signal to the circuitry 202 to control the execution of the video game 710 based on the comparison.

In accordance with an embodiment, the circuitry 202 may be configured to control the image sensor 712 of the one or more sensors to continuously capture a set of images of the player 708 within the duration of the detected gaming session. The circuitry 202 may be further configured to track the movement of an eye of the player 708 in the captured set of images. The circuitry 202 may be further configured to locate the position, on the display screen, where the player is looking based on the tracked movement of the eye, wherein the video game 710 may be rendered on the display screen. The circuitry 202 may be further configured to control the execution of the video game to adjust one or more rules or a game state associated with the level of the video game 710 based on the located position (such as suggesting pauses in case of sleepiness).

In accordance with an embodiment, the video game 710 may be a co-operative game and wherein the modification in the one or more aspects includes increasing an ability of a game character associated with the player.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that includes a portion of an integrated circuit that also performs other functions.

The present disclosure may also be embedded in a computer program product, which includes all the features that enable the implementation of the methods described herein, and which, when loaded in a computer system, is able to carry out these methods. Computer program, in the present context, means any expression, in any language, code or notation, of a set of instructions intended to cause a system with an information processing capability to perform a particular function either directly, or after either or both of the following: a) conversion to another language, code or notation; b) reproduction in a different material form.

While the present disclosure has been described with reference to certain embodiments, it will be understood by those skilled in the art that various changes may be made, and equivalents may be substituted without deviation from the scope of the present disclosure. In addition, many modifications may be made to adapt a particular situation or material to the teachings of the present disclosure without deviation from its scope. Therefore, it is intended that the present disclosure is not limited to the embodiment disclosed, but that the present disclosure will include all embodiments falling within the scope of the appended claims.

What is claimed is:

1. A system, comprising:
   circuitry configured to:
   detect a gaming session that includes an execution of a video game of a plurality of video games for a first gameplay;
   acquire, from at least one sensor, sensor data associated with a player involved in the first gameplay, wherein the sensor data corresponds to a duration of the detected gaming session;
   determine at least one indicator of a dissatisfaction of the player with the first gameplay, based on an application of at least one Artificial Intelligence (AI) model of a plurality of AI models on the sensor data;
   determine a satisfaction level of the player with one of the first gameplay or the video game based on an analysis of the sensor data;
   compare the satisfaction level of the player with a threshold, wherein the threshold is personalized for the player;
   control the execution of the video game based on the determined at least one indicator and the comparison of the satisfaction level of the player with the threshold;
   modify at least one aspect associated with one of the first gameplay or a second gameplay of the video game based on the control of the execution of the video game, wherein the second gameplay that is different from the first gameplay;
   generate a profile of the player based on the determined at least one indicator and the determined satisfaction level; and
   recommend at least one video game of the plurality of video games to the player based on the generated profile.

2. The system according to claim 1, wherein the modification in the at least one aspect comprises at least one of:
   a change in at least one game state of the video game that is associated with one of the first gameplay or the second gameplay,
   a change in at least one attribute of a visual component included in the video game,
   a change in at least one attribute of an audible component included in the video game,
   an activation of at least one of a hint or a guide for at least one of a level or a segment of one of the first gameplay or the second gameplay,
   a switch from a current game difficulty level to a different game difficulty level,
   an activation of an option to skip one of the level or an objective of the level associated with one of the first gameplay or the second gameplay, or
   an activation of an alternate option to complete the level or the objective.

3. The system according to claim 1, wherein the at least one sensor or comprises at least one of a camera sensor, a depth sensor, a microphone, a pressure sensor, a heart rate sensor, an accelerometer sensor, a temperature sensor, a sweat sensor, a humidity sensor, a haptic sensor, a three dimensional (3D) scanner, or a brain controlled interface.

4. The system according to claim 1, wherein the at least one indicator of the dissatisfaction includes at least one of a facial expression, a body language, a verbal tone, a physiological reaction, an emotion, one or more behavioral changes or actions of the player in the duration of the detected gaming session, a stress level, or one or more keywords enunciated by the player within the duration of the detected gaming session.

5. The system according to claim 1, wherein the circuitry is further configured to:
  receive a player input associated with a purchase of a first video game of the plurality of video games that is different from the video game;
  load the profile of the player based on the received player input, wherein the profile indicates at least one of the satisfaction level of the player and the determined at least one indicator of the dissatisfaction of the player; and
  modify, based on the profile, the at least one aspect associated with a gameplay of the first video game, wherein the at least one aspect of the first video game is modified one of before or after the execution of the first video game to enable the gameplay of the first video game.

6. The system according to claim 1, wherein the circuitry is further configured to:
  determine, within the duration of the detected gaming session, a time spent by the player in a level of the video game;
  compare the determined time spent with a threshold time;
  control wherein the execution of the video game based on the comparison of the determined time spent with the threshold time; and
  modify one of at least one rule associated with the level of the video game or a current game state associated with the level of the video game.

7. The system according to claim 1, wherein the circuitry is further configured to:
  determine, within the duration of the detected gaming session, a count of attempts made by the player to play a level of the video game;
  compare the determined count with a count threshold;
  control the execution of the video game based on the comparison of the determined count with the count threshold; and
  modify one of at least one rule associated with the level of the video game or a current game state associated with the level of the video game.

8. The system according to claim 1, wherein the circuitry is further configured to:
  detect a failure in a completion of a level of the video game by the player;
  control a microphone to capture audio spoken by the player within the duration of the detected gaming session;
  apply a first AI model of the plurality of AI models on the captured audio, wherein the first AI model is a natural language processing model;
  determine at least one cause for the failure in the completion of the level;
  control wherein the execution of the video game is controlled further based on the determined at least one cause; and
  modify one of at least one rule associated with the level of the video game or a current game state associated with the level of the video game.

9. The system according to claim 1, wherein the circuitry is further configured to:
  control an image sensor of the at least one sensor to capture an image of the player within the duration of the detected gaming session;
  receive the captured image from the image sensor;
  apply a second AI model of the plurality of AI models on the captured image,
    wherein the second AI model is pre-trained to determine an emotional state of the player;
    determine the emotional state of the player based on the application of the second AI model; and
  control the execution of the video game based on the determined emotional state.

10. The system according to claim 1, wherein the circuitry is further configured to:
  determine a genre of the video game;
  determine, over a period, a baseline stress level of the player for each genre of a plurality of video game genres; and
  control the execution of the video game based on the determined genre and the baseline stress level associated with the determined genre of the video game.

11. The system according to claim 1, further comprising a video game controller coupled with the circuitry, and wherein the video game controller is configured to:
  control a pressure sensor associated with the video game controller to capture, within the duration of the detected gaming session, a pressure pattern applied by the player on buttons of the video game controller;
  compare the captured pressure pattern with a pressure threshold; and
  transmit a signal to the circuitry based on the comparison of the captured pressure pattern with the pressure threshold,
  wherein the execution of the video game is controlled further based on the signal.

12. The system according to claim 1, wherein the circuitry is further configured to:
  control an image sensor of the at least one sensor to continuously capture a set of images of the player within the duration of the detected gaming session;
  track a movement of an eye of the player in the captured set of images;
  determine, on a display screen that renders the first gameplay, a region at which the player is looking based on the tracked movement of the eye;
  control the execution of the video game based on the determined region; and
  modify one of at least one rule associated with a level of the video game or a current game state associated with the level of the video game.

13. The system according to claim 1, wherein
  the video game is a co-operative game, and
  the modification in the at least one aspect includes a modification in an ability of at least one of a game character or object that is controlled by the player.

14. A method, comprising:
  detecting a gaming session that includes an execution of a video game of a plurality of video games for a first gameplay;

acquiring, from at least one sensor, sensor data associated with a player involved in the first gameplay, wherein the sensor data corresponds to a duration of the detected gaming session;

determining at least one indicator of a dissatisfaction of the player with the first gameplay, based on an application of at least one Artificial Intelligence (AI) model of a plurality of AI models on the sensor data;

determining a satisfaction level of the player with one of the first gameplay or the video game based on an analysis of the sensor data;

comparing the satisfaction level of the player with a threshold, wherein the threshold is personalized for the player;

controlling the execution of the video game based on the determined at least one indicator and the comparison;

modifying at least one aspect associated with one of the first gameplay or a second gameplay of the video game based on the control of the execution of the video game, wherein the second gameplay is different from the first gameplay;

generating a profile of the player based on the determined at least one indicator and the determined satisfaction level; and recommending at least one video game of the plurality of video games to the player based on the generated profile.

15. The method according to claim 14, wherein the modification in the at least one aspect comprises at least one of:

a change in at least one game state of the video game that is associated with one of the first gameplay or the second gameplay, a change in at least one attribute of a visual component included in the video game, a change in at least one attribute or more attributes of an audible component included in the video game, an activation of at least one of a hint or a guide for at least one of a level or a segment of one of the first gameplay or the second gameplay, a switch from a current game difficulty level to a different game difficulty level, an activation of an option to skip one of the level or an objective of the level associated with one of the first gameplay or the second gameplay, or an activation of an alternate option to complete the level or the objective.

16. The method according to claim 14, wherein the at least one sensor comprises at least one of a camera sensor, a depth sensor, a microphone, a pressure sensor, a heart rate sensor, an accelerometer sensor, a temperature sensor, a sweat sensor, a humidity sensor, a haptic sensor, a three dimensional (3D) scanner, or a brain controlled interface.

17. The method according to claim 14, wherein the at least one indicator of the dissatisfaction includes at least one of a facial expression, a body language, a verbal tone, a physiological reaction, an emotion, one or more behavioral changes or actions of the player in the duration of the detected gaming session, a stress level, or at least one keyword or more keywords enunciated by the player within the duration of the detected gaming session.

18. A non-transitory computer-readable medium having stored thereon, computer-executable instructions that when executed by a processor of a system, causes the processor to execute operations, the operations comprising:

detecting a gaming session that includes an execution of a video game of a plurality of video games for a first gameplay;

acquiring, from at least one sensor, sensor data associated with a player involved in the first gameplay, wherein the sensor data corresponds to a duration of the detected gaming session;

determining at least one indicator of a dissatisfaction of the player with the first gameplay, based on an application of at least one Artificial Intelligence (AI) model of a plurality of AI models on the sensor data;

determining a satisfaction level of the player with one of the first gameplay or the video game based on an analysis of the sensor data;

comparing the satisfaction level of the player with a threshold, wherein the threshold is personalized for the player;

controlling the execution of the video game based on the determined at least one indicator and the comparison of the satisfaction level of the player with the threshold;

modifying at least one aspect associated with one of the first gameplay or a second gameplay of the video game based on the control of the execution of the video game, wherein the second gameplay is different from the first gameplay;

generating a profile of the player based on the determined at least one indicator and the determined satisfaction level; and recommending at least one video game of the plurality of video games to the player based on the generated profile.

19. A system, comprising:

circuitry configured to:

detect a gaming session that includes an execution of a video game of a plurality of video games for a first gameplay;

acquire, from at least one sensor, sensor data associated with a player involved in the first gameplay, wherein the sensor data corresponds to a duration of the detected gaming session;

determine at least one indicator of a dissatisfaction of the player with the first gameplay, based on an application of at least one Artificial Intelligence (AI) model on the sensor data;

determine a satisfaction level of the player with one of the first gameplay or the video game based on an analysis of the sensor data;

compare the satisfaction level of the player with a threshold, wherein the threshold is personalized for the player;

control the execution of the video game based on the determined at least one indicator and the comparison;

modify at least one aspect associated with one of the first gameplay or a second gameplay of the video game based on the control of the execution of the video game, wherein the second gameplay is different from the first gameplay;

generate a profile of the player based on the determined at least one indicator and the determined satisfaction level;

recommend at least one video game of the plurality of video games to the player based on the generated profile;

receive a player input associated with a purchase of a first video game that is different from the video game;

load the profile of the player based on the received player input, wherein the profile indicates at least one of the satisfaction level of the player and the determined at least one indicator of the dissatisfaction of the player; and modify, based on the profile, the at least one aspect associated with a gameplay of the first video game, wherein the at least one aspect of the first video game is modified one of before or after the execution of the first video game to enable the gameplay of the first video game.

\* \* \* \* \*